(12) United States Patent
Diao

(10) Patent No.: US 9,538,133 B2
(45) Date of Patent: Jan. 3, 2017

(54) CONVEYING GAZE INFORMATION IN VIRTUAL CONFERENCE

(76) Inventor: Jie Diao, Fremont, CA (US)

(*) Notice: Subject to any disclaimer, the term of this patent is extended or adjusted under 35 U.S.C. 154(b) by 447 days.

(21) Appl. No.: 13/244,114

(22) Filed: Sep. 23, 2011

(65) Prior Publication Data

US 2013/0076853 A1 Mar. 28, 2013

(51) Int. Cl.
*H04N 7/15* (2006.01)

(52) U.S. Cl.
CPC .............. *H04N 7/15* (2013.01); *H04N 7/157* (2013.01)

(58) Field of Classification Search
USPC ................................. 348/14.09, 14.01, 14.08
See application file for complete search history.

(56) References Cited

U.S. PATENT DOCUMENTS

| | | | |
|---|---|---|---|
| 5,159,445 A | 10/1992 | Gitlin et al. | |
| 5,500,671 A * | 3/1996 | Andersson | H04N 7/15 348/14.1 |
| 5,619,254 A | 4/1997 | McNelley | |
| 6,128,649 A | 10/2000 | Smith et al. | |
| 6,714,234 B1 | 3/2004 | Hillis et al. | |
| 6,784,916 B2 | 8/2004 | Smith | |
| 6,812,956 B2 | 11/2004 | Ferren et al. | |
| 6,906,742 B1 | 6/2005 | Hillis et al. | |
| 7,092,002 B2 | 8/2006 | Ferren et al. | |
| 7,202,887 B2 | 4/2007 | Hillis et al. | |
| 7,230,639 B2 | 6/2007 | Ferren et al. | |
| 7,262,788 B2 * | 8/2007 | Ono et al. | 348/14.09 |
| 7,460,150 B1 | 12/2008 | Coughlan et al. | |
| 7,528,860 B2 | 5/2009 | Harville et al. | |
| 7,532,230 B2 | 5/2009 | Culbertson et al. | |
| 7,679,639 B2 | 3/2010 | Harrell et al. | |
| 7,773,108 B2 | 8/2010 | Hillis et al. | |
| 7,783,077 B2 | 8/2010 | Miklos et al. | |

(Continued)

FOREIGN PATENT DOCUMENTS

| | | |
|---|---|---|
| CN | 102067593 A | 5/2011 |
| TW | 297985 B | 2/1997 |
| WO | 2009120814 A2 | 10/2009 |

OTHER PUBLICATIONS

KIPO International Search Report, PCT/US2012/054676, Feb. 1, 2013, 2 pages.

(Continued)

*Primary Examiner* — Amal Zenati
(74) *Attorney, Agent, or Firm* — Innovation Counsel LLP

(57) ABSTRACT

A system and a method for executing a virtual conference that conveys gaze information are presented. Where there are three nodes, input from the first node indicating a gaze recipient of a first participant is received, the gaze recipient being associated with one of the second and third nodes. A virtual space is constructed in which representations of the first participant, a second participant who is associated with the second node, and a third participant who is associated with the third node are positioned in a predetermined order. The gaze angle of the first participant in the virtual space is determined based on the position of the representation of the first participant's gaze recipient in the virtual space. An image that includes the first participant looking at his gaze recipient in the virtual space, as seen from the position of the second participant in the virtual space, is generated.

21 Claims, 28 Drawing Sheets

(56) References Cited

U.S. PATENT DOCUMENTS

| | | | |
|---|---|---|---|
| 7,839,434 B2 | 11/2010 | Ciudad et al. | |
| 7,840,638 B2 | 11/2010 | Zhang et al. | |
| 7,847,814 B2 * | 12/2010 | Ferren | H04N 7/15 348/14.08 |
| 7,865,834 B1 | 1/2011 | Van Os et al. | |
| 7,876,978 B2 | 1/2011 | Berger et al. | |
| 7,880,739 B2 | 2/2011 | Long et al. | |
| 7,884,846 B2 | 2/2011 | Ferren et al. | |
| 7,893,935 B1 | 2/2011 | Neely, III et al. | |
| 8,581,956 B2 * | 11/2013 | Robinson | H04N 7/15 348/14.06 |
| 2005/0007445 A1 | 1/2005 | Foote et al. | |
| 2005/0093971 A1 | 5/2005 | Ono et al. | |
| 2009/0147070 A1 | 6/2009 | Marathe et al. | |
| 2010/0045785 A1 | 2/2010 | Carl | |
| 2010/0165169 A1 | 7/2010 | Bilbrey | |
| 2010/0225733 A1 | 9/2010 | Beers et al. | |
| 2010/0238265 A1 | 9/2010 | White | |
| 2010/0245535 A1 | 9/2010 | Mauchly | |
| 2010/0253761 A1 | 10/2010 | White | |
| 2010/0295920 A1 | 11/2010 | McGowan | |
| 2010/0302344 A1 | 12/2010 | Large et al. | |
| 2010/0309285 A1 | 12/2010 | Bolle | |
| 2010/0315481 A1 | 12/2010 | Wijngaarden et al. | |
| 2010/0315482 A1 | 12/2010 | Rosenfeld et al. | |
| 2011/0018981 A1 | 1/2011 | White | |
| 2011/0025819 A1 | 2/2011 | Gorzynski et al. | |
| 2013/0093838 A1 * | 4/2013 | Tan | H04N 7/144 348/14.16 |

OTHER PUBLICATIONS

Dumont et al., "Optimized Two-Party Video Chat with Restored Eye Contact Using Graphics Hardware." ICETE 2008, CCIS 48, pp. 358-372, 2009.

Vertegaal et al., "GAZE-2: Conveying Eye Contact in Group Video Conferencing Using Eye-Controlled Camera Direction." Human Media Lab, Queen's University, Kingston, ON K7L3N6, Canada.

Quante et al., "Eye-contact in Multipoint Videoconferencing." Heinrich-Hertz-Institut fur Nachrichtentechnik Berlin GmbH (HHI) Einsteinufer 37, D-15087 Berlin, Germany.

De Silva et al., "A Teleconferencing System Capable of Multiple Person Eye Contact (MPEC) Using Half Mirrors and Cameras Placed at Common Points of Extended Lines of Gaze." IEEE Transactions on Circuits and Systems for Video Technology, vol. 5, No. 4, pp. 268-277, Aug. 1995.

Roberts et al., "Communicating Eye-gaze Across a Distance: Comparing an Eye-gaze Enabled Immersive Collaborative Virtual Environment, Aligned Video Conferencing, and Being Together." IEEE Virtual Reality, Lafayette, Louisiana, pp. 135-142, Mar. 14-18, 2009.

Tan et al., "ConnectBoard: A remote collaboration system that supports gaze-aware interaction and sharing." Multimedia Communications and Networking Lab, Hewlett-Packard Labs, 1501 Page Mill Road, Palo Alto, California. IEEE MMSP '09, Rio de Janeiro, Brazil, Oct. 5-7, 2009.

Wang et al., "Spatial Faithful Display Groupware Model for Remote Design Collaboration." Proceedings of the 2009 IEEE International Conference on Systems, Man, and Cybernetics, San Antonio, Texas, Oct. 2009.

Tan et al., "Enabling Genuine Eye Contact and Accurate Gaze in Remote Collaboration." IEEE International Conference on Multimedia Expo, Jul. 19, 2010.

Inkpen et al., "Exploring Spatialized Audio & Video for Distributed Conversations." CSCW 2010, Savannah, Georgia, Feb. 6-10, 2010.

Nguyen et al., "MultiView: Improving Trust in Group Video Conferencing Through Spatial Faithfulness." CHI 2007 Proceedings, San Jose, California, Apr. 28-May 3, 2007.

Monk et al., "A look is worth a thousand words: full gaze awareness in video-mediated conversation." Department of Psychology, University of York, York, YO1 5DD, U.K., Feb. 27, 2001.

Beall et al., "Non-Zero-Sum Gaze in Immersive Virtual Environments." Research Center for Virtual Environments and Behavior, Department of Psychology, University of California, Santa Barbara, California.

Modlitba, Paulina, "Audiovisual Attentive User Interfaces—Attending to the needs and actions of the user." T-121.900 Seminar on User Interfaces and Usability.

Biehl et al., "Addressing the Opportunities and Challenges of Working Anytime from Anywhere." FX Palo Alto Laboratory, 3400 Hillview Ave., Building 4, Palo Alto, California, 94304.

Carletta et al., "Eyetracking for two-person tasks with manipulation of a virtual world." Behavior Research Methods, 42 (1), pp. 254-265, 2010.

Cherubini et al., "Gaze and Gestures in Telepresence: multimodality, embodiment, and roles of collaboration." International Workshop New Frontiers in Telepresence 2010, part of CSCW2010, Savannah, Georgia, Feb. 7, 2010.

Weiner et al., "Virtual Gaze Redirection in Face Images." Department of Electrical Engineering-Systems, Tel-Aviv University, Tel Aviv 69978, Israel.

Nguyen et al., "MultiView: A Spatially Faithful Video-Conferencing System." PowerPoint presentation.

Hopkins, Gail, "Same Time—Different Place 1." PowerPoint presentation.

* cited by examiner

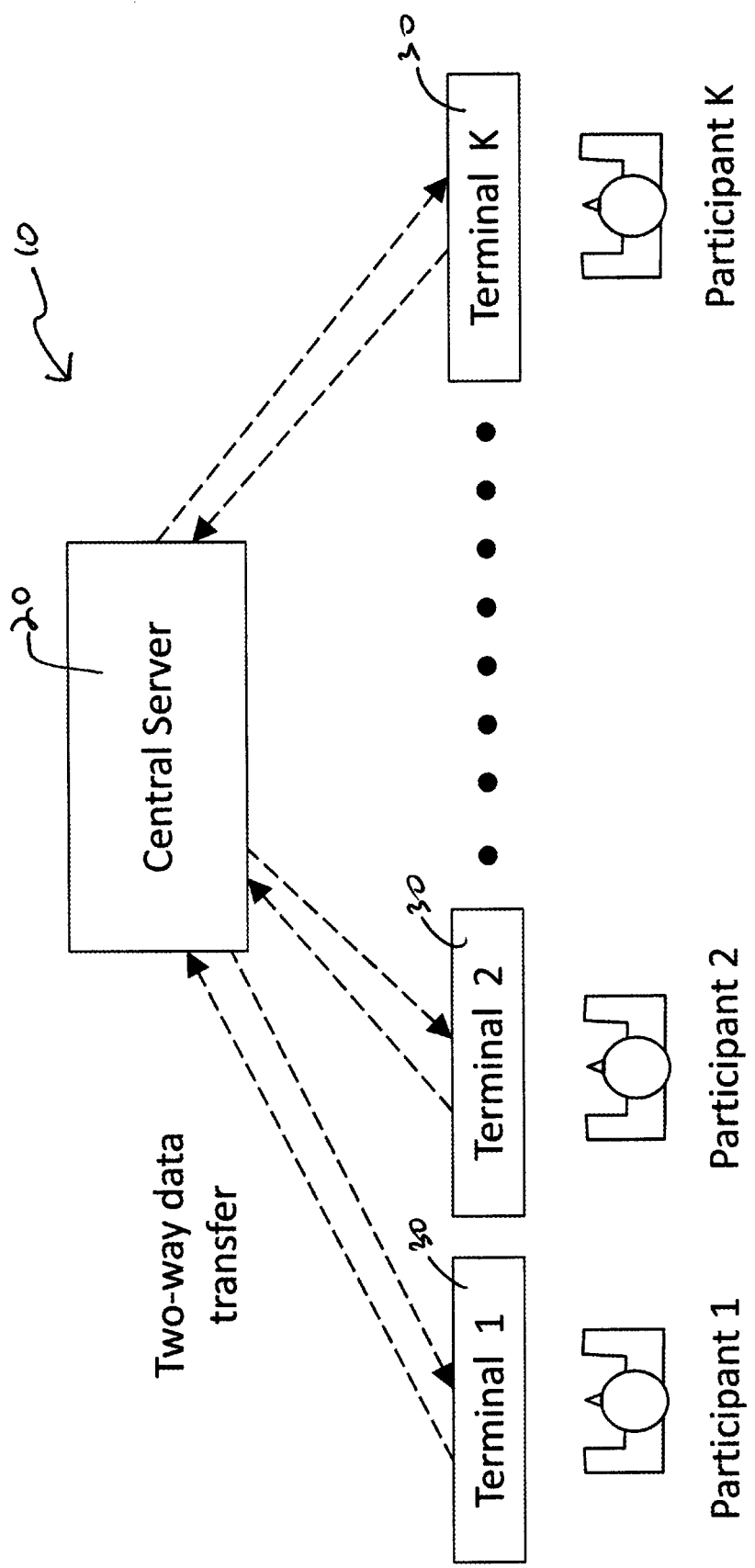

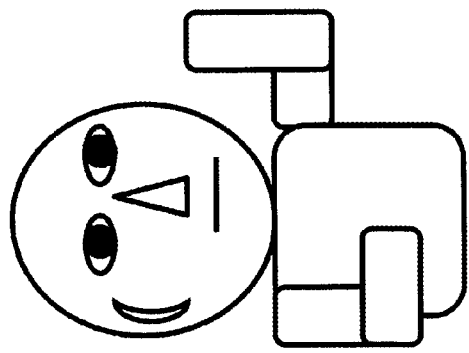
In the virtual space, both the face and the body are re-oriented in accordance with the gaze
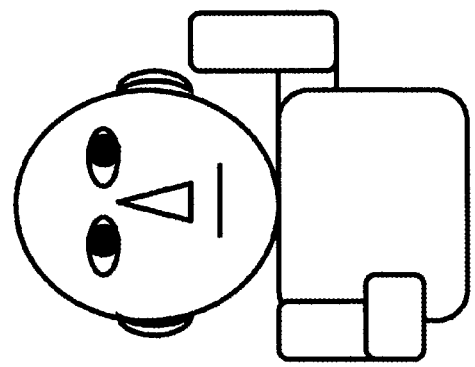
In a face-to-face meeting, a person can move his/her gaze without moving the face or the body
FIG. 9

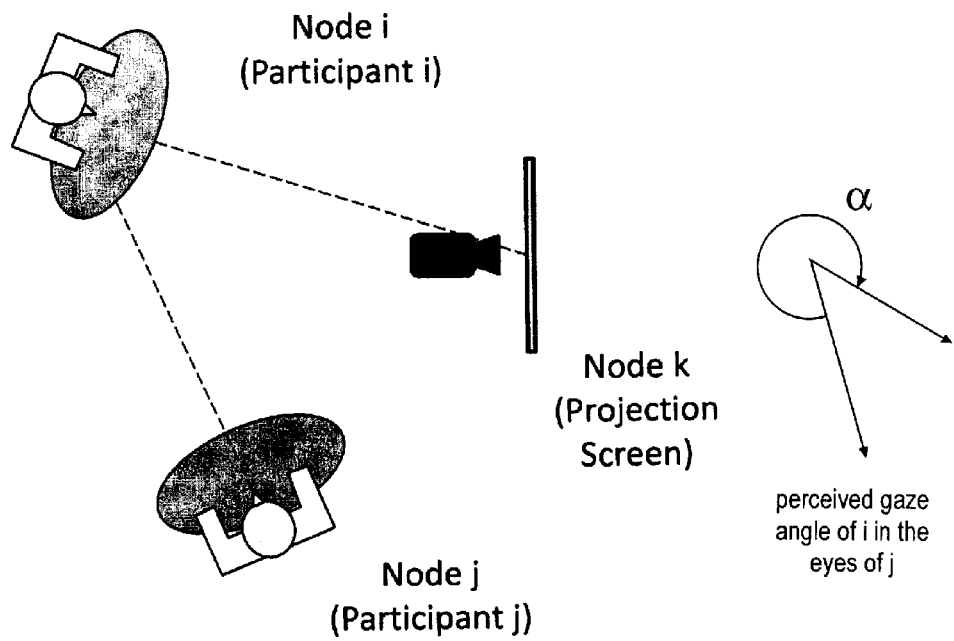
FIG. 10A
FIG. 10B
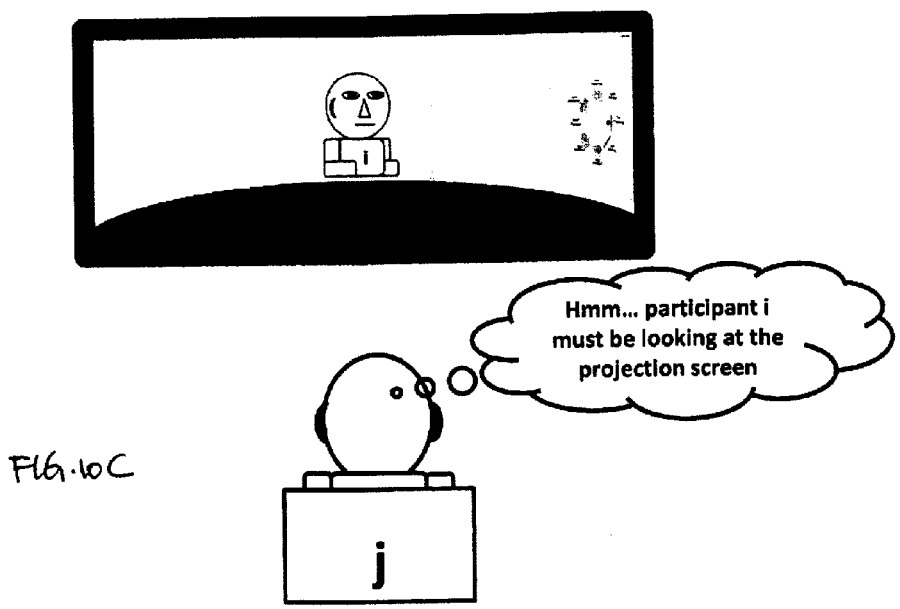
FIG. 10C

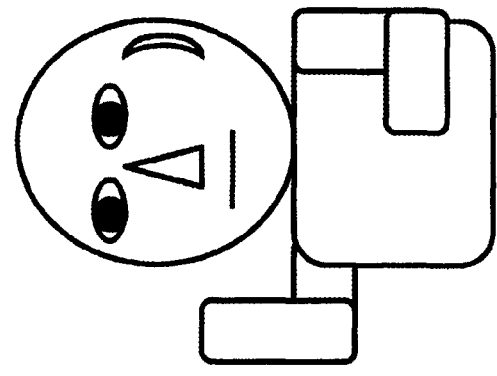
Image after mirroring
Perceived gaze angle = 360°−α
Right hand raised
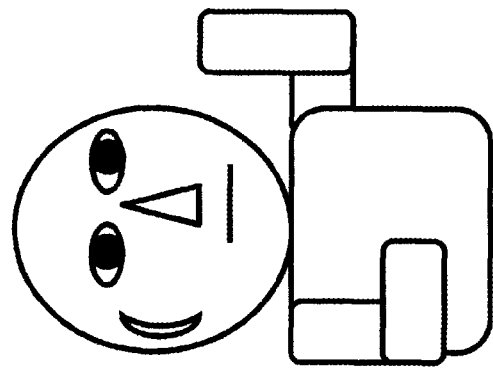
Image before mirroring
Perceived gaze angle = α
Left hand raised
Figure 17

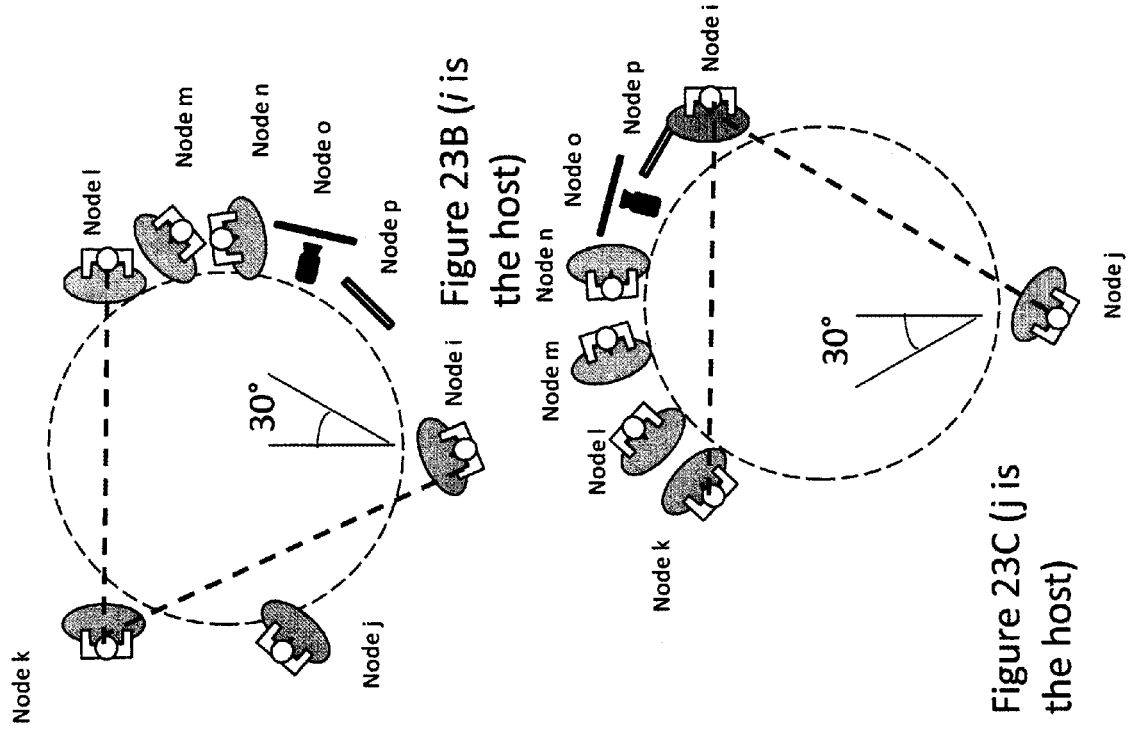
Figure 23B (i is the host)
Figure 23C (j is the host)
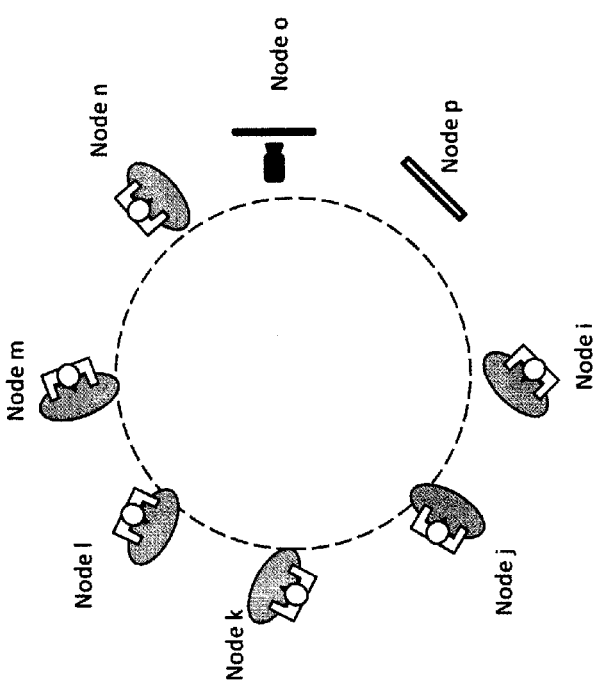
Figure 23A

CONVEYING GAZE INFORMATION IN VIRTUAL CONFERENCE

FIELD OF INVENTION

The present invention relates generally to virtual conferencing and more particularly to virtual conferencing capable of conveying gaze information.

BACKGROUND

Virtual conferencing in the form of video conferencing has become widely available in the past decade. Video conferencing provides a convenient way for participants to "meet" without traveling to be physically together. In addition to saving time and cost associated with traveling, video conference is environmentally friendly, as it should help avoid unnecessary driving and flying. In spite of the above advantages, video conferencing is under-utilized today and people still travel distances for face-to-face meetings. This is because many people find video conferencing to be a poor substitute for face-to-face meetings.

One of the reasons video conferencing is unsatisfactory is the loss of eye contact and gaze information. Studies have shown that spatial distortions of eye contact have a negative impact on effective communication in video conference. Conference participants like knowing who is looking at whom and if anyone is looking at them, and lack of these information makes video conferencing impersonal, uncomfortable and ineffective for many people. Moreover, absence of eye gaze information can even lead to miscommunication. For example, in a video conference with multiple people, it is sometimes difficult to tell exactly whom the speaker is talking to. When the speaker asks, "Could you handle that?" at the end of a long job description, multiple people could assume that they are each being asked to handle the job. The possibility of this type of miscommunication leads people to avoid handling important communication via a video conference, forcing them to travel.

There is a need for a virtual conferencing system that is capable of preserving accurate gaze information.

SUMMARY

In one aspect, the invention includes a computer-implemented method of executing a virtual conference among a first node, a second node, and a third node. The method includes receiving input from the first node indicating a gaze recipient of a first participant associated with the first node, wherein the gaze recipient is associated with one of the second and third nodes, constructing a virtual space in which representations of the first participant, a second participant who is associated with the second node, and a third participant who is associated with the third node are positioned in a predetermined order, determining a first gaze angle of the first participant in the virtual space based on the position of the representation of the first participant's gaze recipient in the virtual space, and generating an image to be transmitted to the second node, wherein the image includes the first participant looking at his gaze recipient in the virtual space, as seen from the position of the second participant in the virtual space.

In another aspect, the invention includes a computer-implemented method of executing a virtual conference including a first node and a second node, wherein the first node is associated with a first participant looking at a first gaze recipient and the second node is associated with a second participant looking at a second gaze recipient. The method entails receiving input from the first node indicating that the second participant is the first gaze recipient, wherein the second participant is displayed on a first display device at the first node, obtaining a watching-you image of the first participant by using an imaging device that is aligned with the image of the second participant that is displayed on the first display device, and transmitting the watching-you image of the first participant to the second node.

In yet another aspect, the invention is a computer-implemented method of executing a virtual conference between a first node and a second node. The invention includes receiving images of a first participant captured from different angles, the first participant being associated with the first node, constructing a virtual space in which representations of the first participant and a second participant are positioned in a predetermined configuration, wherein the second participant is associated with the second node, receiving input from the first node about the first participant's gaze recipient, selecting one of the images that portrays the first participant looking at the gaze recipient in the virtual space as seen from a perspective of the second participant in the virtual space, and providing the selected one of the images to the second node.

In yet another aspect, the invention is a computer-implemented method of executing a virtual conference among a plurality of nodes, wherein one of the nodes is associated with a host participant and other nodes are respectively associated with peer participants. The method entails constructing a virtual space in which representations of the host participant and the peer participants are positioned in a predetermined order, and providing an image of the virtual space to the node that is associated with the host participant, wherein the image is dynamically adjusted to include different sections of the virtual space depending on who the host participant's gaze recipient is.

In yet another aspect, the invention is a virtual conferencing system that includes a central server, a host terminal, and peer terminals. The host terminal is configured to report to the central server a first gaze recipient of a host participant and transmit images of the host participant captured from different angles. The peer terminals are configured to report to the central server gaze statuses of respective peer participants at the peer terminals and transmit to the central server images of the peer participants obtained from different angles. The central server is configured to construct a virtual space with representations of the host participant and the peer participants positioned in a known configuration and generate an image from a perspective of the host participant, wherein the image portrays the peer participants looking in the direction of their respective gaze recipients in the virtual space.

DESCRIPTION OF THE DRAWINGS

FIGS. 1A and 1B depict embodiments of a virtual conference system in accordance with the invention.

FIG. 9 depicts the alignment of a participant's gaze direction with his body orientation in the virtual space.

FIGS. 10A, 10B, and 10C illustrate how Participant j will be able to tell the gaze direction of Participant i based on synthesized view of virtual space.

FIG. 17 illustrates mirroring of an image.

FIGS. 23A, 23B, and 23C depict static and dynamic layouts of participants in the virtual space.

DETAILED DESCRIPTION

Figure 1B:
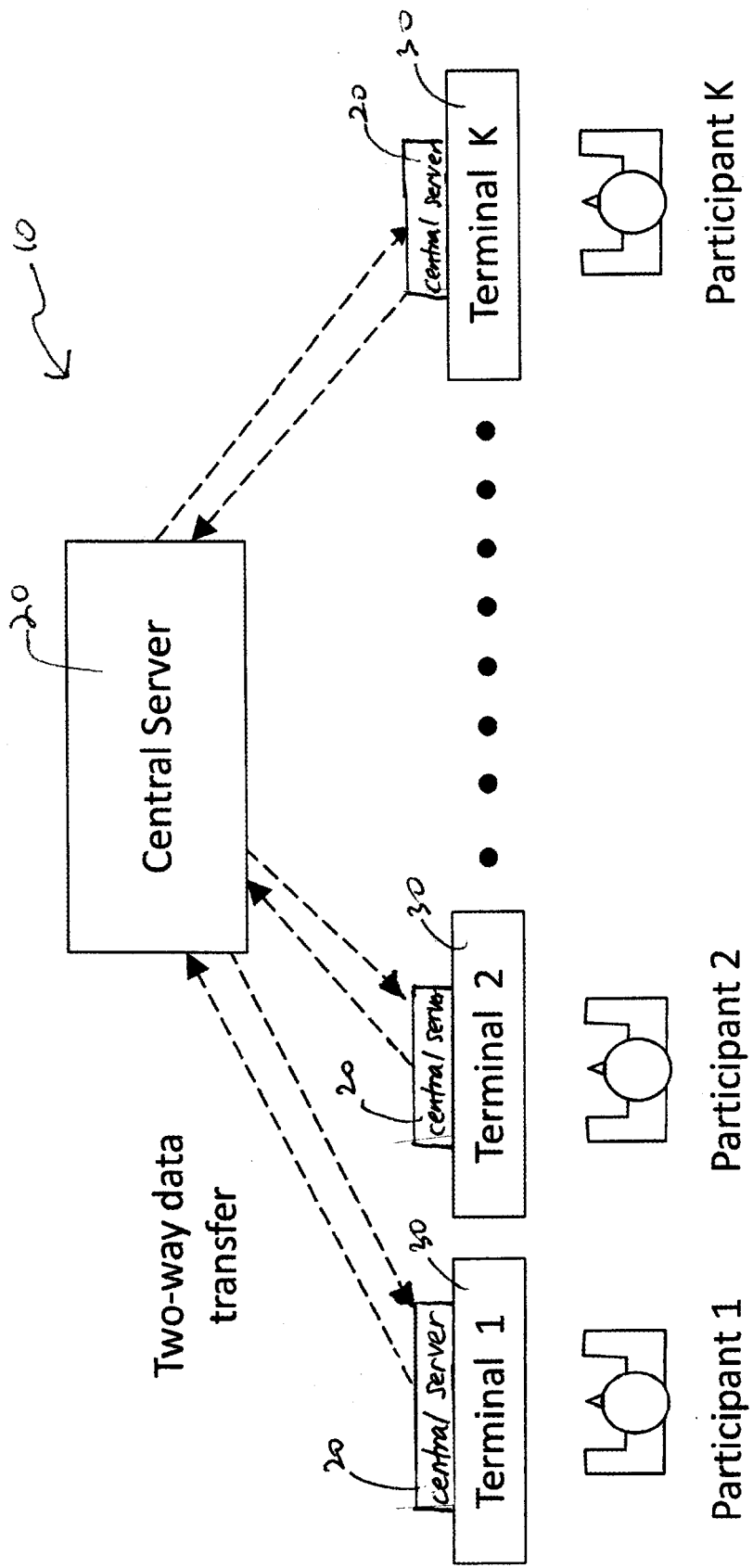

The invention pertains to a method and system for accurately conveying gaze information in a virtual conference. Although the invention will be described in the context of a virtual conference, it will be understood that this is not a limitation of the invention and the concepts disclosed herein can be adapted to other applications, such as virtual games or image display.

Spatial faithfulness can be defined at different levels. With Mutual Spatial Faithfulness, participants are able to see when someone else is paying attention to them or not. With Partial Spatial Faithfulness, a participant is able to tell the general direction of someone's attention. With Full Spatial Faithfulness, a participant is able to correctly perceive the specific object of someone's attention. This invention is capable of preserving spatial faithfulness in a video conference by 1) guiding the gaze of conference participants to capture images that accurately reflect predetermined gaze angles of each participant, and 2) synthesizing and displaying views that create a sense of reality to the conference participants with respect to gaze information.

A "conference," as used herein, is intended to include any type of meeting or exchange and is not limited to a formal business meeting. A "virtual conference" is intended to include any type of meeting or exchange that does not require participants to be in the same physical location, such as video conference. A "participant" may be a human being, a robot, a virtual cartoon figure, an inanimate object, etc. A "host participant" is the conference participant who is viewing other conference participants on his display device, and a "peer participant" is a conference participant who is not the host participant.

FIG. 1A depicts a virtual conference system 10 of the invention. The virtual conference system 10 includes a central server 20 and a plurality of terminals 30. There is a two-way data transfer capability between each of the terminals 30 and the central server 20, allowing the terminals 30 to communicate with one another via the central server 20. Both visual data and audio data are transmitted among the terminals 30. The terminals 30 may be at remote geographical locations (e.g., different cities), although this is not a limitation of the invention.

Each terminal 30 is equipped with audio and video input and output devices, and each terminal 30 may have a virtual conference participant. The central server 20 collects data from each terminal 30, constructs a virtual space, and generates an appropriate, custom view to present at each terminal 30. The view displayed at each of the terminals 30 emulates the view that the participant at that terminal 30 would have if all the participants were sitting in a real room that is arranged similarly to the virtual space. The virtual views may preserve mutual, partial, and even full spatial faithfulness and non-verbal cues, depending on the embodiment and as described in more detail below. Hence, the effectiveness of communication can be similar to that in a face-to-face meeting. The audio input/output devices at the terminals 30 allow the participants to hear each other.

A terminal in the virtual conference system 10 corresponds to a "node." A "node" is a logically independent entity in the system 10, and there is a plurality of nodes in the virtual conference system 10. For example, a node may be associated with a human participant, a projection screen, a white board, an empty seat, or even an empty space. A node may also be a simulation of video conference terminal from another system, allowing participants using different systems to engage in a conference. A node may correspond to multiple objects. For example, a projection screen and a white board can share the same node. In such a case, each conference participant can decide which one to display on his screen. Not every node corresponds to a terminal, however. For example, the white board node may be a board that is generated by the central server 20.

FIG. 1B is another embodiment of the virtual conference system 10 of the invention, and illustrates that the central server 20 does not have to be one physical unit at one location. The central server 20 is defined by its processing capability, and can thus be partially remote to the terminals 30 and partially at the terminals 30.

Figure 2:
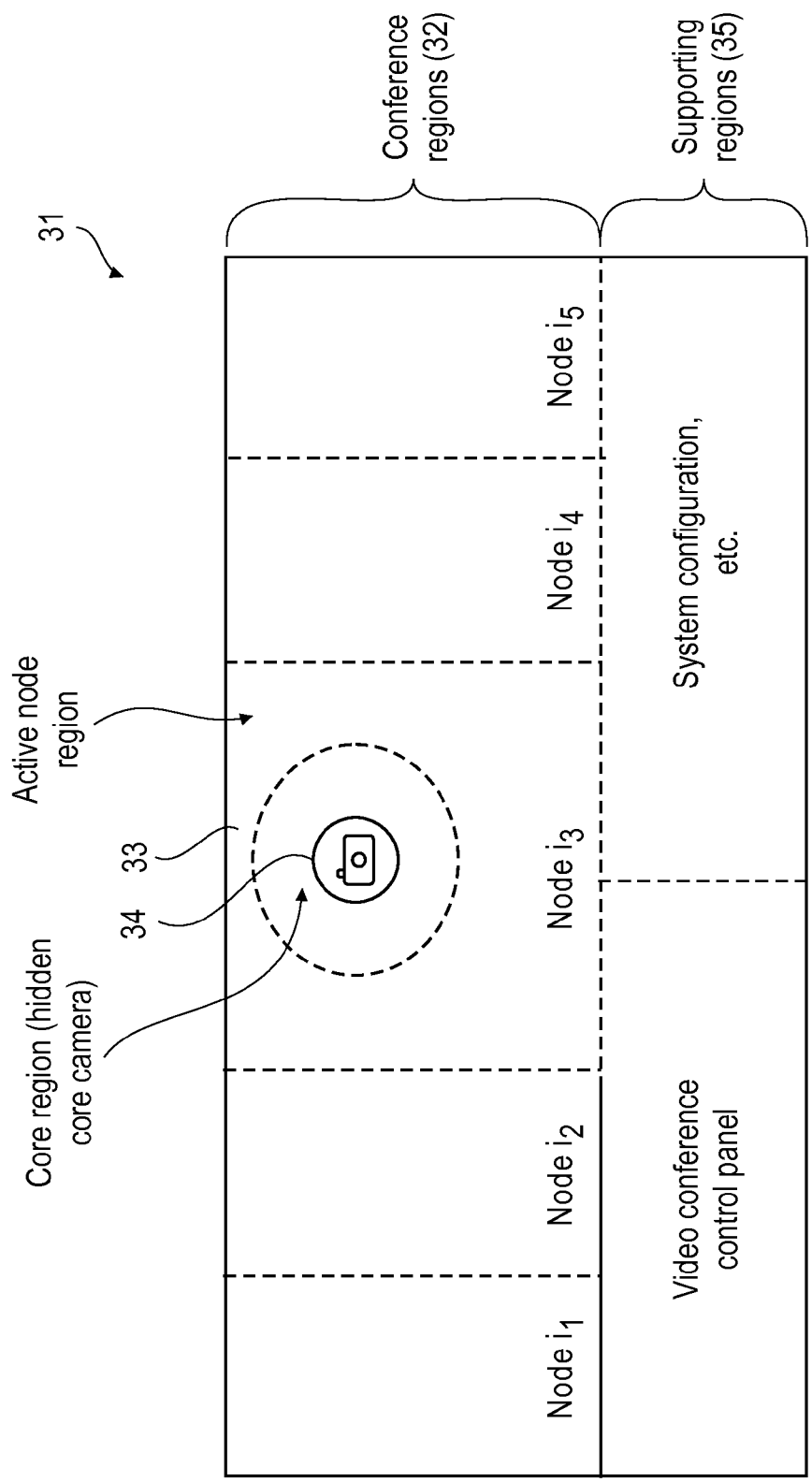
FIG. 2 depicts an example of what may be shown on the video input and output device at a terminal.

FIG. 2 depicts an example of what may be shown on the video input and output device at a terminal 30. The video input and output device may include a display device 31. The display device 31 displays images, and a frame of images that are displayed is herein referred to as a "screen." An "image" may be a video or a photograph. As the view from each terminal is constructed to emulate the view that a participant would have if he were sitting in a physical space, the participants do not see themselves in the conference region 32. On the display device 31, a conference region 32 displays images of each of the other nodes in the conference. For example, in a conference where there are five human participants and a projection screen, wherein one of the human participants is Participant i, the display device 31 at the terminal 30-i for Participant i shows four human participants and the projection screen.

As used herein, the letter designating a node, such as "i," indicates that something belongs to that node. For example, terminal i would be a terminal that corresponds to node i, and the display device 31-i would be the display device at terminal i, Participant i would be the participant at terminal i in front of the display device 31-i, etc.

At each terminal, the central server 20 periodically monitors input from the terminal and makes judgment as to whether the participant is looking at a node. The node being looked at is herein referred to as the "gaze recipient." If the participant looks at a gaze recipient for longer than a predetermined threshold amount of time, that gaze recipient is locked in as the "active node." This designation of a node as the "active node" is herein referred to as the active node lock-in (ANL) function.

A part of the conference region 32 is designated an "active-node region" 33. Among all the nodes in the conference region 32, one node will be designated as the active node and displayed in the active-node region 33. The central server 20 determines which node Participant i is looking at. Upon determining that Participant i is looking at Participant j and designating node j as the active node, the central server 20 automatically moves the image of Participant j to the active-node region 33-i. This way, the gaze of Participant i is directed or guided to the active-node region 33-i. In one embodiment of the invention, the active node region 33-i includes or is close to a core camera 34-i that captures a "watching-you" image of Participant i looking at the active-node region 33-i. This "watching-you" image of Participant i is transmitted to the display device 31-j at the terminal 30-j, allowing Participant j to see that Participant i is looking at him. If Participant j looks at Participant i, the image of Participant i will be displayed in the active-node region 33-j at terminal 30-j, the core camera 34-j will capture the "watching-you" image of Participant j, and this image will be transmitted to Participant i. This way, Participant i and Participant j have successfully established eye contact.

More generally, the invention establishes eye contact by determining the active node (usually the gaze recipient) and actively aligning the image of the active node with the active-node region, which encompasses the core region at each terminal 30 (as in the embodiment of FIG. 2). The "core region" is the region a participant has to look at for the "watching-you image" to be properly captured by the core camera 34. By displaying the gaze recipient in the active node region that is aligned with the core region, the gaze of a participant is guided to the core camera, allowing the core camera to capture the "watching-you" image of the participant. A "camera" is any device capable of capturing images for transmission, including real-time video streams and photographs. The displaying of the active node in the active node region where the core camera 34 can capture the "watching-you" image of the participant is herein referred to as the eye gaze guiding (EGG) function. More specifically, displaying the active node in the active node region is referred to as "gross gaze guiding."

When Participant i shifts his gaze to Participant k (making Participant k the new gaze recipient), an active node reassignment may be triggered. The image of Participant j will get moved off of the active-node region 33-i and the image of Participant k will move into the active-node region 33-i. The core camera 34-i captures the "watching-you" image of Participant i and this image will be transmitted to Participant k, who will then know that Participant i is looking at him.

Figure 3:
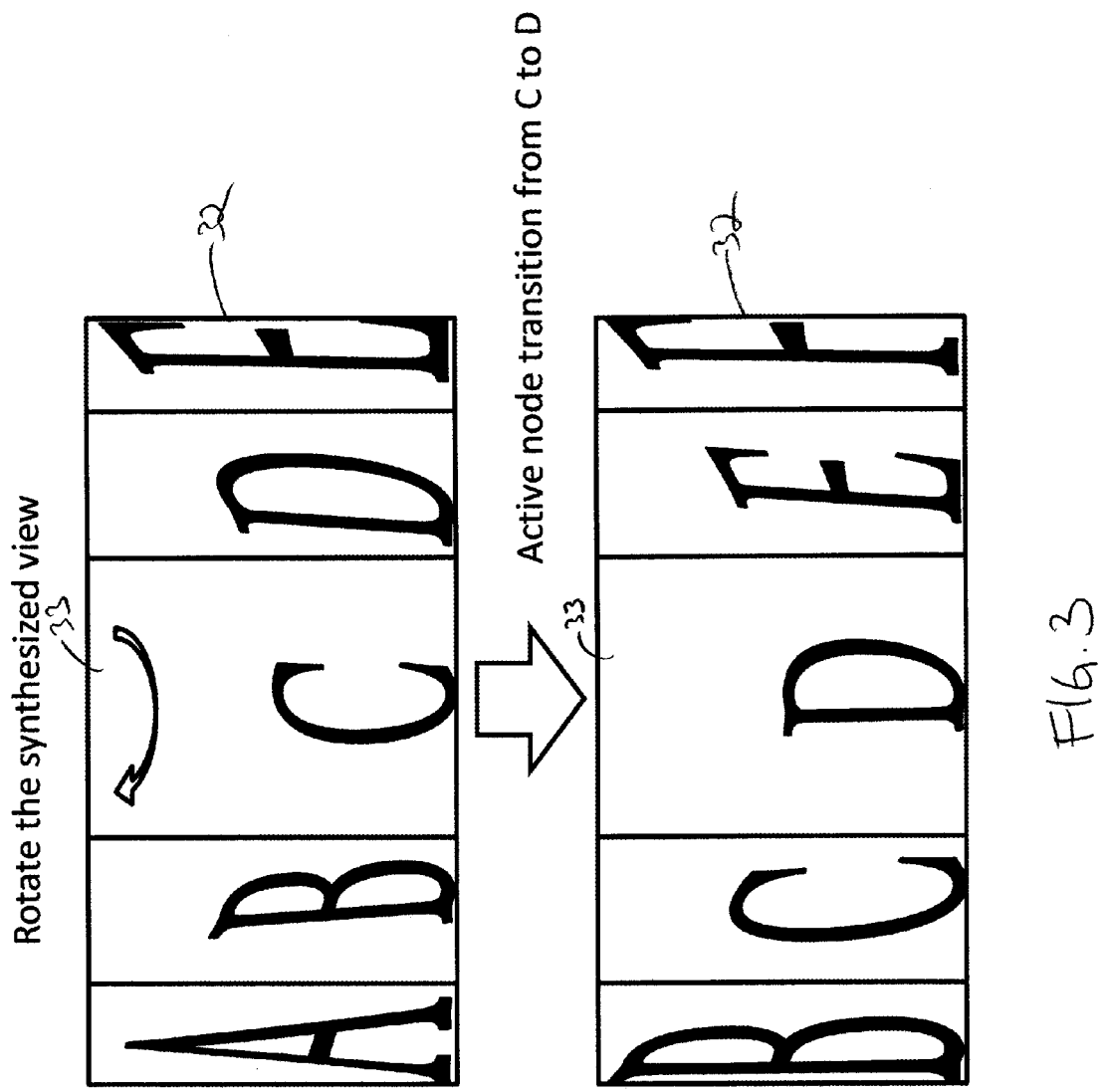
FIG. 3 depicts how the view on a display device at a terminal changes with active node reassignment.

FIG. 3 depicts active node transition, or how the view on a display device 31 changes with active node reassignment. In the top view, node "C" is in the active node region 33. When the viewer shifts his gaze to node "D," the view in the conference region 32 shifts to bring node "D" into the active node region 33. As shown, when there is a change in active node, the display positions of all nodes on the screen are changed. The order in which the participants are arranged, however, usually remains unchanged. The change may be effectuated in a way that avoids abrupt visual effects, for example by a continuous sliding or rotating of the view in one direction. During screen transition, the regions on the display device 31 corresponding to different nodes change continuously (without an abrupt shift in the displayed content). In one embodiment, the image of node "C" would be moved gradually to the left so that it transitions to the left edge of the active node region 33, crosses the edge, and enters the display area to the left of the active node region 33 while the image of node "D" moves into the active node region 33 starting at the right edge of the active node region 33. The experience to the user may be as if he was looking at the virtual space through a window and he adjusted the position of the window to place a different node in the center area. This continuous, non-abrupt transition is herein referred to as "shifting" of an image.

The system may track gaze data—i.e., data about which node a participant is looking at—automatically or based on manual participant input. In the automatic detection mode, each terminal 30 is equipped with an eye gaze tracking system that is able to determine which region of the display device 31 a participant is looking at. By combining this gaze status data with screen data about which node is being displayed in the region that the participant is looking at, the system can automatically decide which node the participant is looking at. In a manual mode, the participant "tells" the central server 20 whom he is looking at, for example by selecting the image of a node from the display device 31 by touching the image on the screen, placing a cursor over the image and clicking, etc. Although the description provided herein assumes that the terminals 30 are operating under the automatic detection mode for simplicity, it will be understood that some or all the terminals 30 may be operating under the manual mode.

As demonstrated in FIGS. 5 and 6 below, not all the participants are displayed on the display device 31 all the time. Sometimes, the host participant will want to shift his gaze to a peer participant who is not currently being displayed. In the automatic detection mode where the host participant's eye gaze is tracked, the host participant can move the "window" by looking at a certain area on the display device 31. For example, he may look at a left arrow or a bar that extends along the left edge to move the displayed view to the left. In the manual mode, the host participant may click on an arrow or a bar to "scroll" left/right.

The central server 20 makes a gaze status determination prior to assigning a node to the active node region. In principle, the continuously redefined screen regions during screen transition may be used together with real time gaze data in making judgment to decide gaze status. However, in practice, if screen transition can be accomplished in a short period, the judgment result can be "frozen" during the screen transition. In other words, the judgment results will remain the same as the pre-transition ones until the transition is over. This will help to lessen problems caused by eyes unable to move quickly enough to track the active node during screen transition.

In some embodiments, the core camera 34 may be positioned (e.g., hidden) behind the display device 31 or around the display device 31, close to the active-node region 33. To capture the "watching-you" image of Participant i, the system incorporates an eye gaze guiding function that induces Participant i to fix his gaze on the active-node region 33. This eye gaze guiding function is served by displaying the active node in the active node region 33 and shifting the view when a new node is assigned as the active node.

In some cases, the area of the active node region 33 may be much larger than the area of the core region. It is therefore possible for the eyes of Participant j to fall outside of the core region. In this situation, even if Participant i is looking into the "eyes" of Participant j in the active node region 33, the image of Participant i that is transmitted to Participant j might look like Participant i is looking at another part of Participant j's face or even somewhere around Participant j's face. Participant j may feel that he lost eye contact with Participant i, and this misunderstanding can affect the communication. To avoid this situation, computer programs may be used to automatically adjust the displayed image so that the eyes of the participant displayed in the active node region remain in the core region. This automatic alignment of the eyes in the display with the core region is referred to as fine gaze guiding.

There may be other cameras positioned behind or around the display device 31. These other cameras, herein referred to as non-core cameras, capture "watching-elsewhere" images of Participant i because these cameras are not positioned close to the active-node region 33-$i$. Unless Participant i looks straight at a non-core camera, images captured by the non-core cameras will be "watching-elsewhere" images. As will be described below, these "watching-elsewhere" images, along with the "watching-you" images, are used to accurately depict who is looking at whom in the virtual space 40.

At each terminal, the gaze-tracking device monitors eye gaze from the participant, triggering the central server 20 to make a judgment as to whether the participant is looking at a node. The input may be monitored at a preset time interval, e.g. every 10 milliseconds, and a judgment may be made in response to every input. If the system concludes that the participant is not looking at any node, a null node is designated as the active node. A null node may be, for example, an empty space. The active node does not always correspond to the node the participant actually looks at. For example, Participant i may have been looking at node j for some time, making the system assign node j as the active node. If Participant i quickly glances at other nodes, the system may continue to assign node j as the active node The central server 20 coordinates the images so that a different set of images are displayed at each terminal (e.g., the participant at the respective terminal is not shown on the display device at the terminal, and the perceived gaze angles of peer participants may look different from the perspective of the different participants). Moreover, the central server 20 is capable of independently controlling the size and position of each node that is displayed at the different terminals 30. For example, if the active node corresponds to a projection screen, the size of the active node region might be bigger than if the active node is a human participant.

Optionally, some parts of the display device 31-$i$ can be "degraded" to discourage Participant i from looking at that region. For example, if one of the participants is giving a presentation, images of non-presenters may be degraded to encourage the participants to look at the presenter and the projection screen instead of at other participants. Depending on the embodiment, the degrading may be done based on input from a terminal 30 and executed by the central server 20. An image is "recovered" when it changes from being degraded to not being degraded.

As shown in FIG. 2, the display device 31 has a supporting region 35 in addition to the conference region 32. Supporting region 35 may display any information other than the node images, which are displayed in the conference region 32. For example, the supporting region 35 may display a control panel or system configuration options, etc. In some embodiments, the supporting region 35 shows an image of the conference participant who is at the terminal, allowing one to see himself. This "self-imaging" mode may be desired by participants who want to know what they look like to others.

Figure 4A:
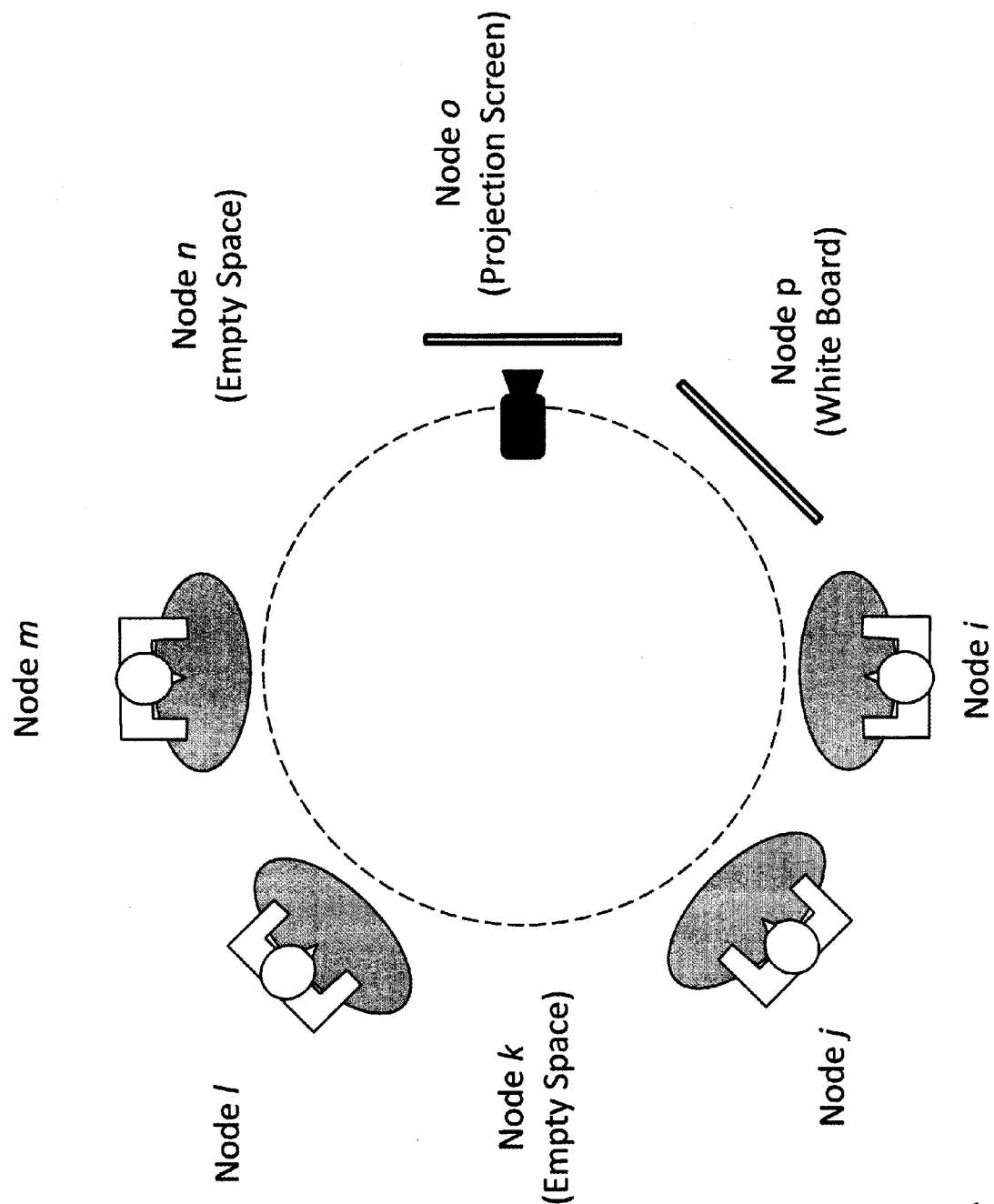
FIGS. 4A and 4B depict an example of a virtual space constructed by the central server of the invention.
Figure 4B:
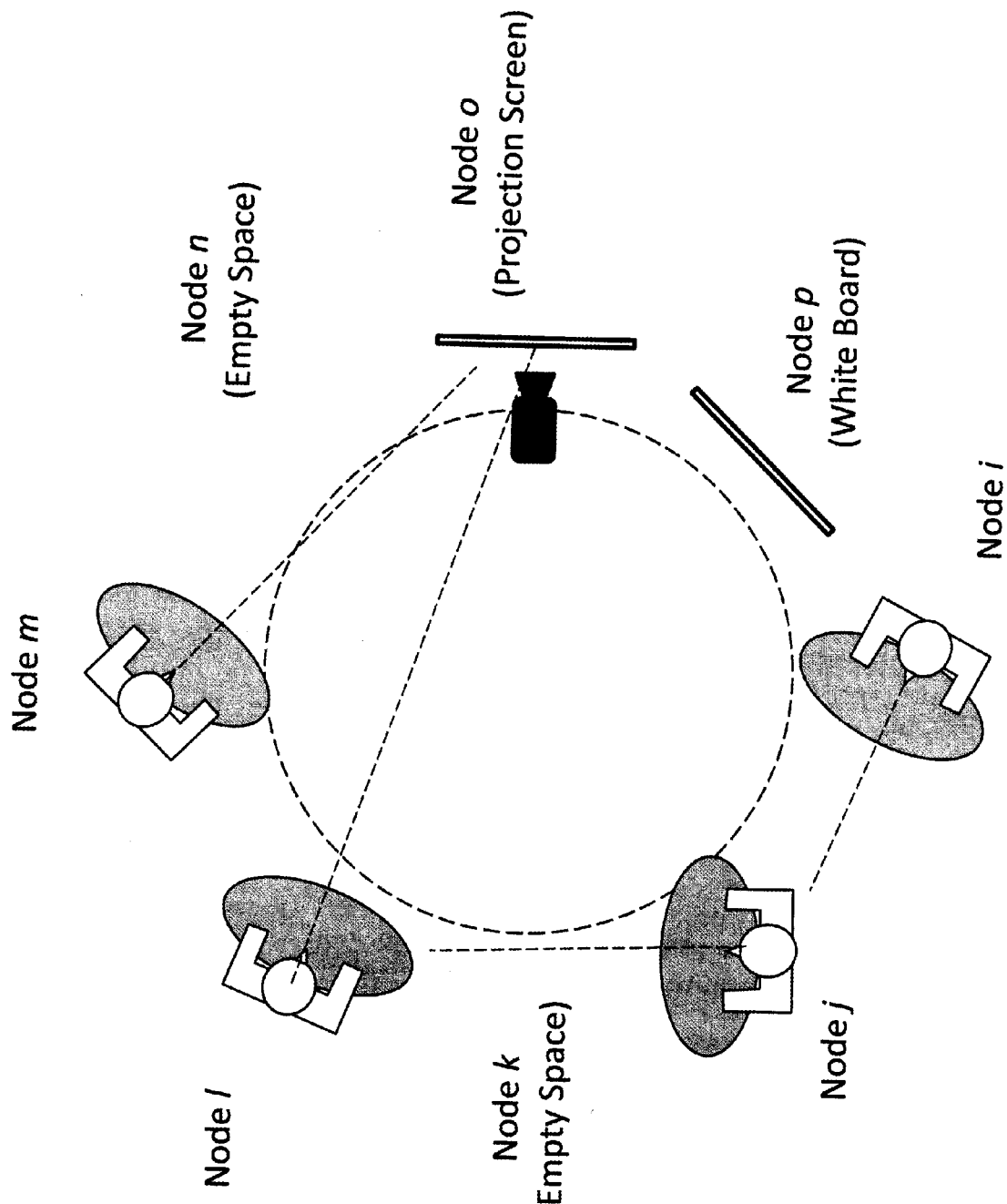

FIGS. 4A and 4B depict an example of a virtual space 40 constructed by the central server 20. What is depicted in FIGS. 4A and 4B is not necessarily the exact image that is shown on the display device 31, but it is an illustration of how the virtual space 40 is constructed. In the particular example, the virtual space 40 has eight nodes: i, j, k, l, m, n, o, and p. Representations associated with the respective nodes are arranged in a circular configuration. The representations associated with the nodes may be equally spaced from one another. Nodes i, j, l, and m have human participants (respectively Participant i, Participant j, Participant l, and Participant m). Where there is a participant at a node, a "representation of the participant" would be the "representation associated with the node." Nodes k and n are empty spaces. The participant at node o is a projection screen, and the participant at node p may be a board. For clarity and simplicity of description, representations associated with nodes are herein simply referred to as "nodes" or "participants", depending on the context. However, a person skilled in the art should understand, from the context of the description, whether the subject matter is the real participant/node in the physical world or a representation of the participant/node.

In one embodiment, participants write on the board, for example by using a method similar to what is described in U.S. Pat. No. 7,681,136.

The virtual space 40 is constructed in which spatial positions of all relevant objects are designated. The spatial positions of relevant objects are closely related to the relative positions of cameras used to capture images. Images from cameras will be selectively displayed at each terminal. Some manipulations of the images such as resizing and distortion are used so that the synthesized view generates a real sense of relative spatial positioning for each participant. This sense of relative spatial positioning, coupled with accurate perceived gaze angles reflected in the images, will achieve a high level of spatial faithfulness in a multiparty conference system.

Figure 5:
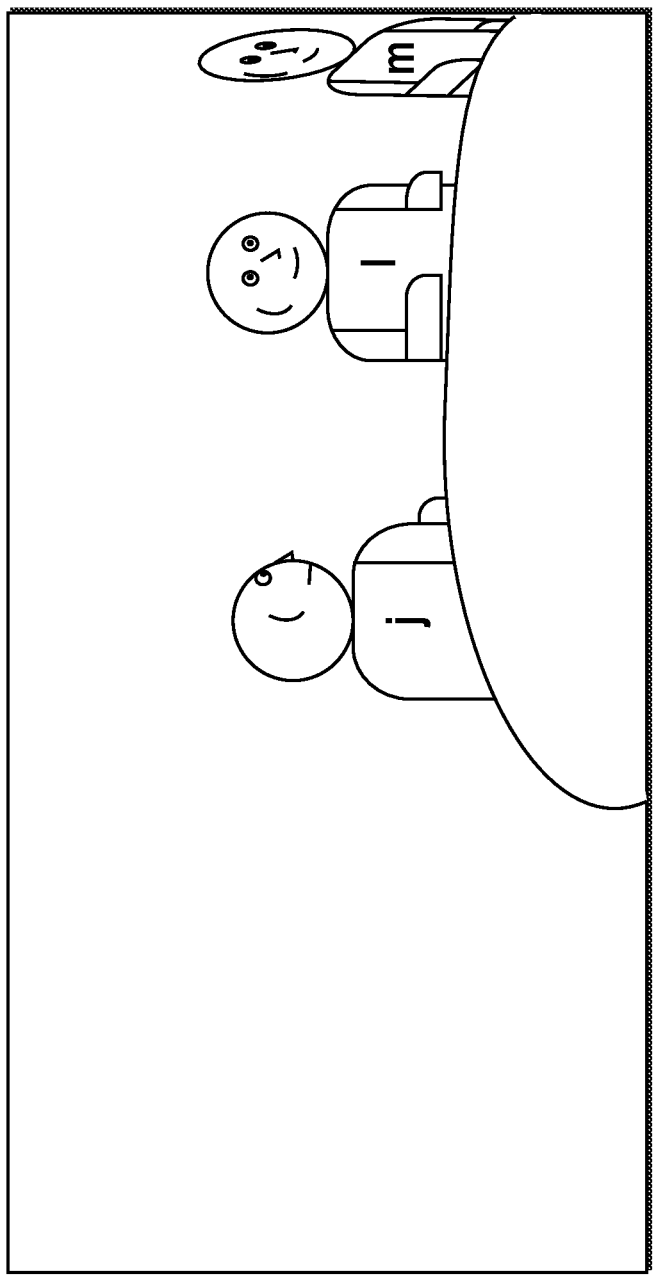
FIG. 5 depicts an example of a view that would be displayed at terminal i when Participant i is looking at Participant j.

FIG. 5 depicts an example of a view that would be displayed at terminal 30-$i$ when Participant i is looking at Participant j as shown in FIG. 4B. As previously mentioned, the conference region 32-$i$ at terminal 30-$i$ is laid out to resemble the view that Participant i would get from his seat in the virtual space 40. When Participant i shifts his gaze in a way as to trigger an active node reassignment, the view on the display device 31-$i$ changes (e.g., shifts in the manner shown in FIG. 3). For example, if Participant i were to shift his gaze to Participant m for more than a brief moment (FIG. 8), Participant m becomes the active node and the view on the display device 31-$i$ would change to what is shown in FIG. 6.

To guide the gaze of each participant, visual display in front of each participant is created in such a way that each participant's gaze is guided toward a predetermined core camera. By fixing the positions of other cameras relative to the core camera, images from all the cameras will reflect predetermined perceived gaze angles when the participant's gaze is guided toward the core camera.

Figure 6:
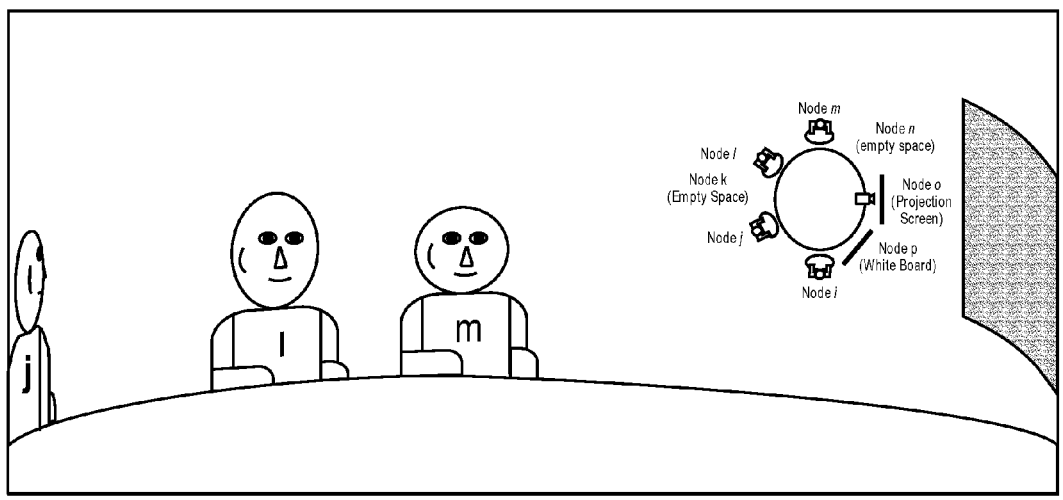
FIG. 6 depicts an example of a view that would be displayed at terminal i when Participant i is looking at Participant m.

To create the views depicted in FIG. 5 and FIG. 6, the central server 20 combines the gaze status determination results of all participants and presents it to each participant as it would be seen from their respective positions in the virtual space. While the gaze status determination for Participant i determines which node is shown in the active node region 33-i, the gaze status determination results for other participants determine how the other participants are displayed (e.g., body and head turned slightly to left, body and head turned to far left, etc.). In FIG. 4B, Participant i is looking at Participant j but Participant j is not looking back at Participant i. Rather, Participant j is looking at Participant l. From terminal 30-i, Participant i sees the view depicted in FIG. 5, which emulates what he would see if the participants were in a real room. If Participant i shifts his gaze to Participant m (FIG. 8), the view displayed at terminal 30-i would change to what is shown in FIG. 6. Not all nodes appear in the synthesized view that is displayed, consistently with the fact that human eyes usually have a horizontal viewing angle of less than 180°.

To accurately depict who is looking at whom in the virtual space 40, the system 10 includes an eye gaze coordination (EGC) function. Eye gaze coordination involves capturing images reflecting predetermined gaze angles and synthesizing views to accurately reflect spatial positioning of different nodes in the virtual space 40. As described above, there are non-core cameras as well as a core camera at each terminal 30. The positions of the non-core cameras determine the perceived gaze angles of a participant in the images. Then, using the correct image of each node, a current view of the virtual space 40 is synthesized. In this synthesizing process, images of different nodes may be manipulated to construct a view that properly conveys the desired information. Such manipulation may include resizing, distortion, flipping, etc.

Figures 7A, 7B:
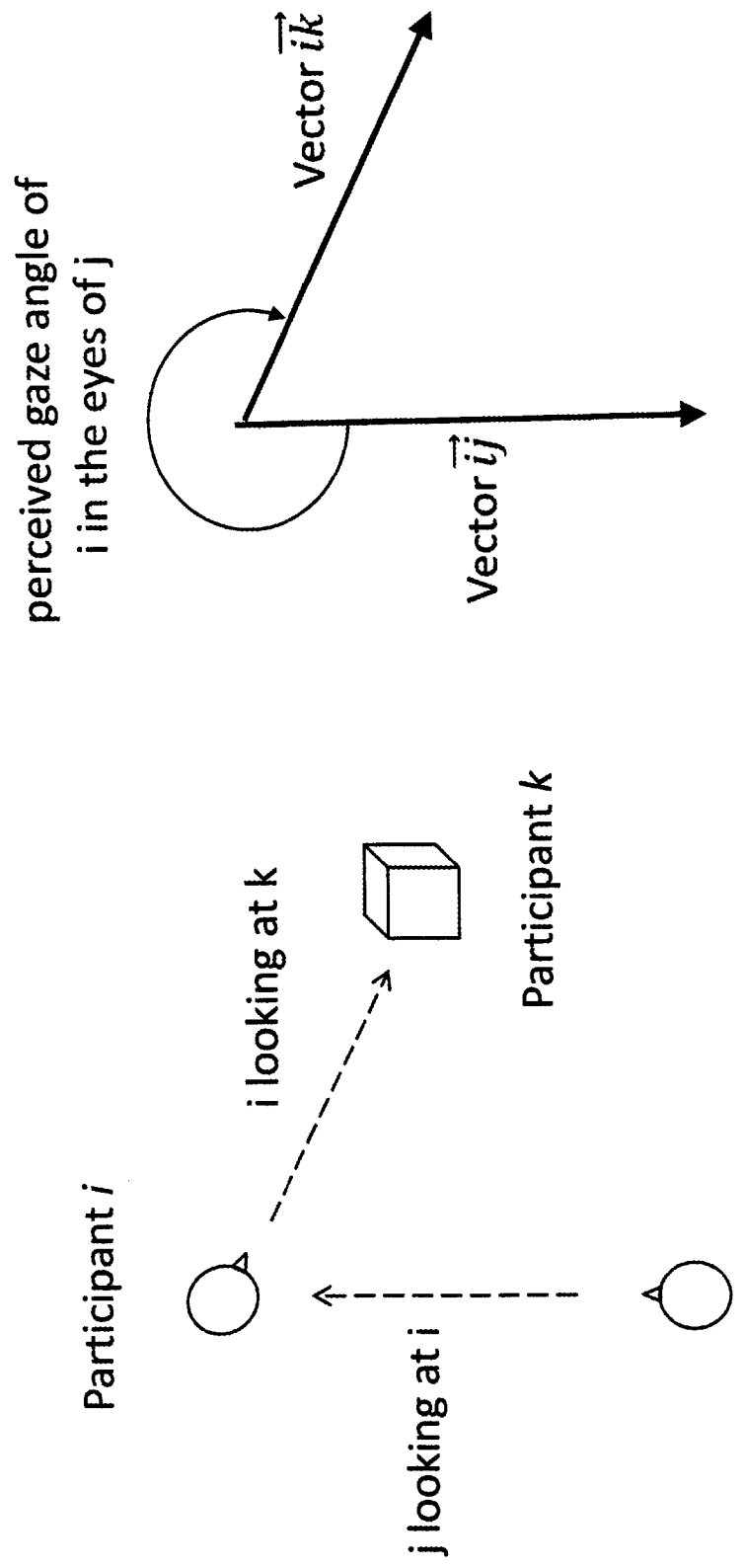
FIGS. 7A and 7B illustrate how gaze angles are determined.

FIGS. 7A and 7B illustrate how gaze angles are determined. Suppose there is a Participant k (e.g., a product or a person) at node k. Further suppose that Participant i is looking at Participant k and Participant j is looking at Participant i, as shown in FIG. 7A. The gaze angle of Participant i as perceived by Participant j is defined as the angle it takes to rotate vector ij clockwise to overlap with vector ik, where vector ij points from i to j and vector ik points from i to k, as shown in FIG. 7B. Points i, j, and k are projections of corresponding objects on the same horizontal plane. To preserve full spatial faithfulness, perceived gaze angles have to be measured to high accuracy. If only partial spatial faithfulness is sought, some rough estimation of perceived gaze direction may be adequate. Table 1 shows how perceived gaze direction is correlated with the perceived gaze angle. Due to inherent lack of precision in the concept of gaze direction, the relation shown in Table 1 is approximate.

TABLE 1

Relation between perceived gaze angle and perceived gaze direction

| Perceived gaze angle of Participant i in the eyes of Participant j | Perceived gaze direction |
| --- | --- |
| Around 0° or 360° | Front |
| Between 0° and 90° | Front right |
| Around 90° | Right |
| Between 90° and 180° | Back right |
| Around 180° | Back |
| Between 180° and 270° | Back left |
| Around 270° | Left |
| Between 270° and 360° | Front left |

If the perceived gaze angle is close to 0° or 360°, Participant j will think that Participant i is looking at him. If Participant j is replaced by a camera and an image of Participant i is taken, the image would be a "watching-you" image because anyone looking at the image will think that Participant i is looking at him (i.e., the so-called Mona Lisa effect). If the perceived gaze angle is not close to 0° or 360°, the image will be called a "watching-elsewhere" image. If the perceived gaze angle is close to 180°, the image will be what is called a "full-back" image.

Figure 8:
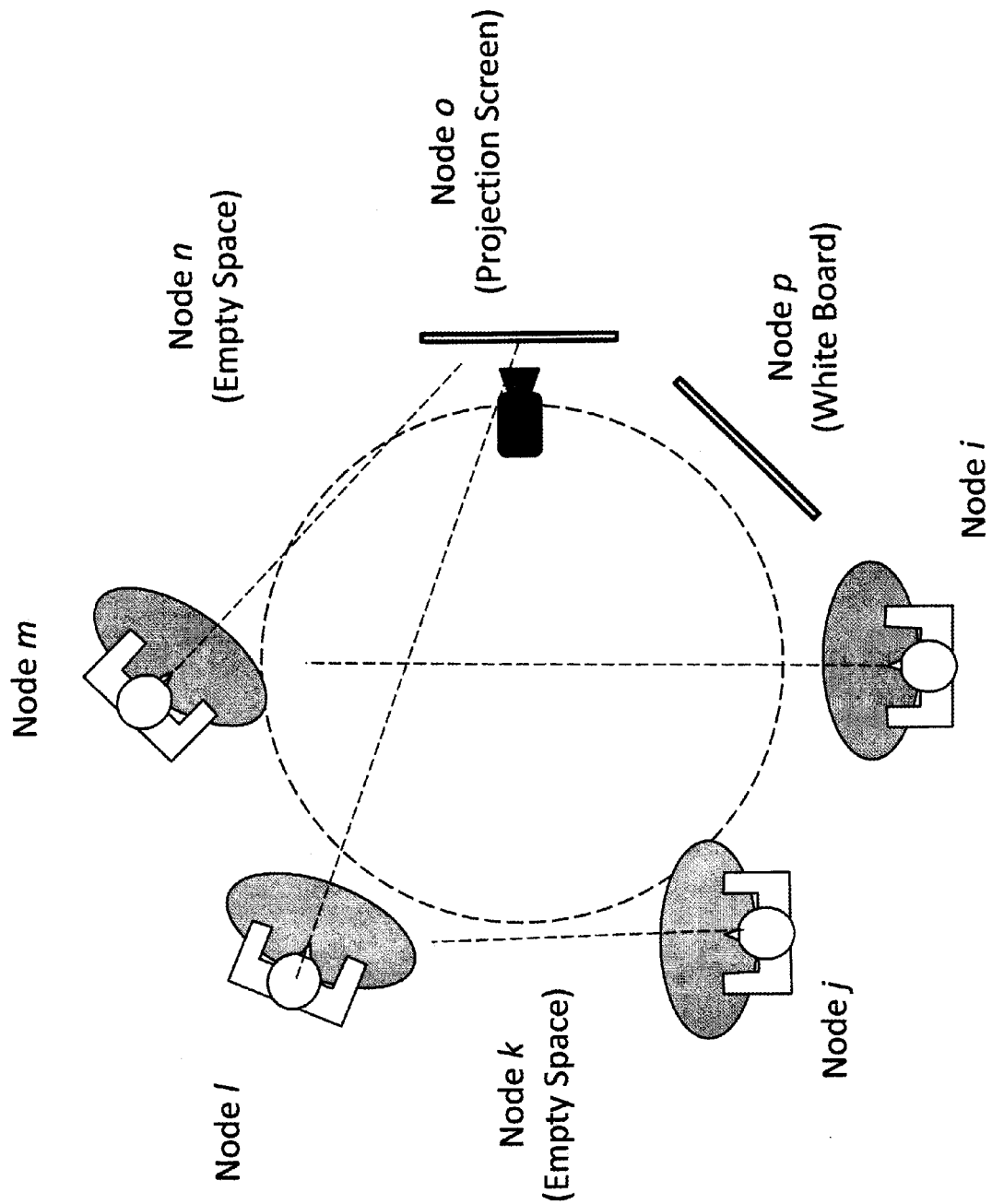
FIG. 8 depicts an example of a virtual space with participants looking at various nodes.

After the central server 20 makes its gaze status determination (who is looking at whom), it constructs the virtual space 40 consistently with the gaze status determination and sends images of the virtual space 40 from each participant's perspective to the respective terminals 30. The virtual space 40 is constructed to preserve the accuracy of gaze angles. In FIG. 8, Participant l and Participant m are looking at the projection screen (node o), Participant j is looking at Participant l and Participant i is looking at Participant m. The body orientations of the participants are consistent with these gaze directions. In a face-to-face meeting in physical space, a person can shift his gaze without moving his body. In the virtual space 40, however, body orientation will change in accordance with the gaze direction.

FIG. 9 depicts how a participant's gaze direction is conveyed with the system 10. In the real world, it is possible for a participant to shift his gaze from one node to another without moving his body, simply by moving his eyes (see left side of FIG. 9). In the system 10, the image of a participant is captured from a number of angles, depending on the positions of the non-core cameras. Due to EGG function, a participant's eye gaze and body orientation are aligned most of the time—that is, the participant is looking straight ahead with body facing forward. Hence, in the system 10, the participants will be portrayed as looking straight ahead (see the right side of FIG. 9) with their bodies facing the gaze recipient.

The virtual space 40 is constructed such that participants appear to be sitting at fixed positions. In other words, the order in which the participants are sitting remains fixed. A sense of depth and distance is created by using various well-known techniques including addition of virtual objects, re-sizing or image distortion among others. A participant using the system 10 may develop a consistent sense of spatial positioning throughout a virtual conference. If Participant i sees that Participant j is looking in a certain direction, the system 10 enables Participant i to relate to the person or object positioned in that direction. For example, in FIGS. 10A, B, and C, if the perceived gaze angle of Participant i in the eyes of Participant j is α, Participant j will be able to tell that Participant i is looking at node k if the synthesized view accurately reflects relative positions of participants in the virtual space 40.

Depending on the hardware and software implementations, the system 10 can be constructed to achieve different levels of spatial faithfulness and convey different types/ amounts of information to participants. Table 2 below lists features of a few systems with different levels of complexity.

TABLE 2

Features of systems with different levels of complexity

| Feature | Fully-Loaded Mode (FLM) | Half-Loaded Mode (HLM) | Degenerated Mode (DLM) | Dual-Camera Mode (DCM) |
|---|---|---|---|---|
| Mutual Spatial Faithfulness | ✓ | ✓ | ✓ | ✓ |
| Partial Spatial Faithfulness | ✓ | ✓ | ✓ | To a limited extent |
| Full Spatial Faithfulness | ✓ | ✓ | | |
| Facial Expression | ✓ | Only with front facing view | Only with front facing view | ✓ |
| Upper Body Movement | ✓ | Only with front facing view | Only with front facing view | Possible with wide lens camera |
| Node-positioning consistency | ✓ | ✓ | ✓ | |

Figure 11:
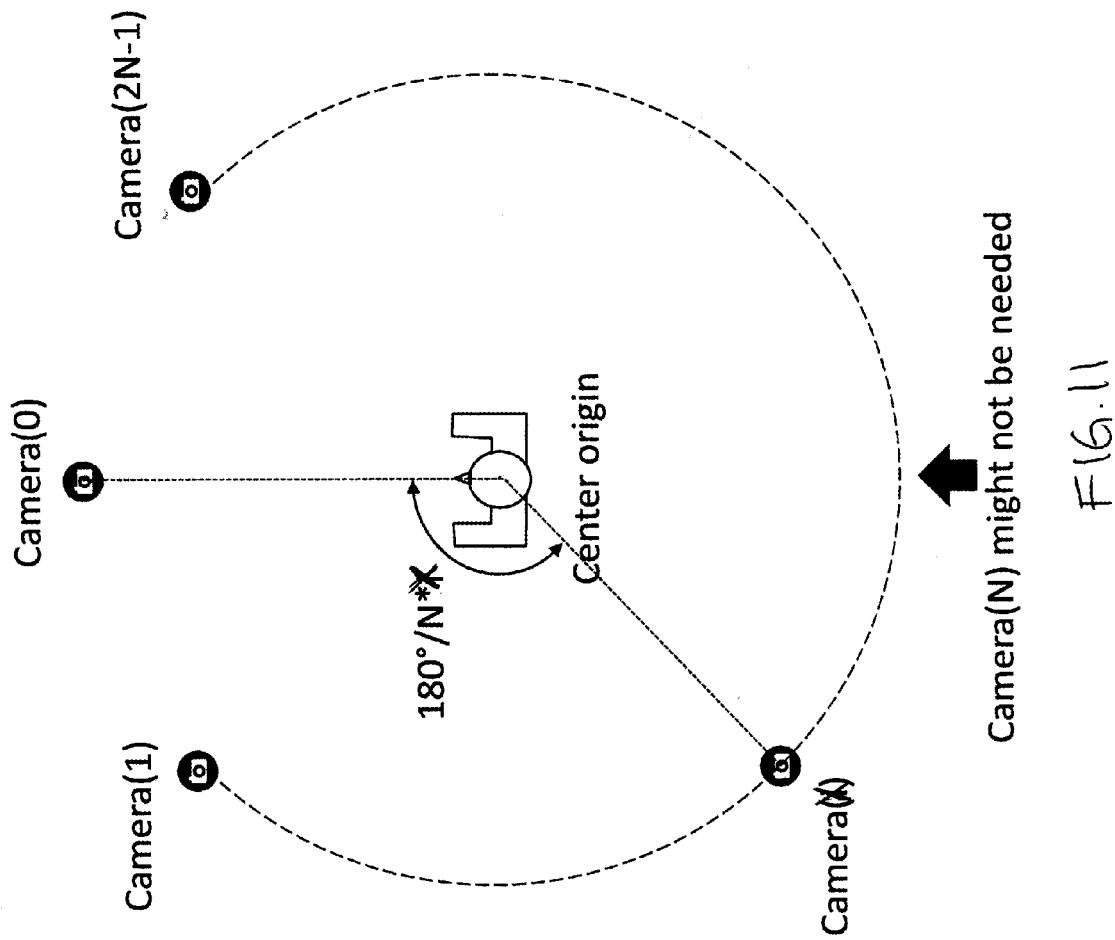
FIG. 11 depicts an example of a camera layout at a terminal operating in fully-loaded mode.

In a fully-loaded mode with N nodes around the virtual circle (herein "FLM(N)"), each terminal will have 2N cameras distributed around the center point, which is usually the point through the center of the participant's head when he sits upright at the terminal 30, as shown in FIG. 11. Referring to FIG. 11, if the angular position of the core camera with respect to the center origin is 0°, other non-core cameras will take angular positions of (180°/N)*x (x being a number between 0 and 2N−1, counted counter-clockwise). The cameras in FIG. 11 are numbered from 0 through 2N−1. Camera N, which is almost directly behind the participant, might not be needed in cases where perceived gaze angle does not reach 180°. The cameras may take an image of the participant simultaneously or sequentially.

In the embodiment of FIG. 11, when the participant looks at the core region—i.e., Camera (0), the perceived gaze angle in the image captured by Camera (x) is (180°/N)*x. So, in an example where N=3, x=2 and there are six cameras, the perceived gaze angle in the image captured by Camera (2) would be (180°/3)×2=120°.

As mentioned above, each terminal 30 may be equipped with an eye gaze tracking system that determines where the participant is looking at. The eye gaze tracking system may also provide information regarding the position of the head and eyes of the participant, which can be used to process the images from all cameras so that the eyes (or the head) of the participant are located around a pre-specified area in the images. This will make fine gaze guiding possible to keep the eyes of the displayed participant in the core region. As long as no participant moves his head dramatically during a virtual conference, fine gaze guiding is not expected to occur often.

In determining where the participant is looking, there is a judgment to be made. Table 3 lists eye gaze judgment based on input from eye gaze tracking system.

TABLE 3

Eye gaze judgment based on input from eye gaze tracking system and the screen

| Input from eye gaze tracking system | Input from the screen | Eye Gaze Judgment |
|---|---|---|
| Eye gaze lost | | Eye gaze lost |
| Eye gaze outside the conference region | | Eye gaze outside conference region |
| Eye gaze inside the conference region | Information on size and position of different regions | Staring at a particular node (e.g., node k) |

Eye gaze judgment shown in Table 3 can be exercised each time the eye tracking system returns gaze data. Dozens of judgment results may be obtained in a second. The central server 20 will process available eye gaze judgment results in a certain time frame to decide which node is the active node. In one embodiment, the number of times in the past one second that a particular eye gaze judgment result was obtained is counted, and the judgment getting the most counts is designated as the current gaze status. If there is a tie in counting, a priority order may be designated, such as node k>eye gaze outside screen>eye gaze lost.

When the current eye gaze status of Participant j is "eye gaze lost," one of the two following actions may be taken:
1. Active Notification Method ("ANM"): Degrade the region showing node j on the display device 31 of participants other than Participant j so that other participants know that Participant j is not looking at the display (i.e., is inattentive). The whole conference region will be degraded on the display device 31 of Participant j to alert Participant j that his gaze is lost. In one case, in the virtual space, Participant j will be treated as if he is looking at the node right across the center of the space (node N+1−j). Node N+1−j will be displayed in the active node region on the screen of Participant j.
2. Null Node Method ("NNM") assuming node n is a null node: Whenever Participant j's gaze is lost, node n will be shown in the active node region of Participant j. In the virtual space, Participant j will be treated as if he is looking at node n. With this method, mutual spatial faithfulness may be compromised if the participant stares at one of the non-core cameras.

When the current eye gaze status of Participant j is outside conference region, one of the two following actions may be taken:
1. The eye gaze does not encompass any non-core cameras. In this case, Participant j's current virtual gaze point and virtual attention status will remain the same.
2. The eye gaze encompasses one non-core camera. In this case, the situation will be treated as if the eye gaze is lost.

In a virtual space similar to the one shown in FIG. 4B, there are N nodes located around the circle with all nodes numbering from 1 to N clockwise. If Participant j is looking at node k (Participant k), the perceived gaze angle PGA (i−j−k) is used to denote the perceived gaze angle of Participant j in the eyes of Participant i in the virtual space 40. Table 4 shows how to calculate the perceived gaze angles and how to select cameras that capture images reflecting the corresponding perceived gaze angles.

TABLE 4

Perceived gaze angles and selection of corresponding cameras

| | PGA(i – j – k) | Camera # at terminal 30 – j whose input will be displayed at terminal 30 – i |
|---|---|---|
| i ≤ k   i < j < k | 180 × (N + k – i)/N | N + k – i |
| j < i or i > k | 180 × (k – i)/N | k – i |
| i > k   i > j > k | 180 × (N + k – i)/N | N + k – i |
| i < j or k > j | 180 × (2N + k – i)/N | 2N + k – i |

Numerics 1, 2, 3, . . . N. may be assigned to the nodes i, j, k, etc. starting at any point and going in the clockwise direction. In Table 4, "i<k" means the numeral that is assigned to the node i is less than the numeral that is assigned to the node k around the conference space 40. Likewise, "j>k" means the numeral assigned to node k is smaller than the numeral assigned to node j.

Table 5 below shows an exemplary set of rules for ANM.

TABLE 5

Rules to decide active node and virtual attention status (for ANM)

| Judgment | | Active node | Virtual attention status | Camera input for participant i | Own screen |
|---|---|---|---|---|---|
| Eye gaze lost | | N + 1 – j | Inattentive | Follow Table 4 (k = N + 1 – j); Degraded | Degraded |
| Eye gaze outside conference region | Encompasses a non-core camera | N + 1 – j | Inattentive | Follow Table 4 (k = N + 1 – j); Degraded | Degraded |
| | Does not encompass any camera | No change | No change | No change | No change |
| Looking at node k | | k | Attentive | Follow Table 4; Normal | Normal |

Table 6 shows an exemplary set of rules to determine the active node and virtual attention status for NNM

TABLE 6

Rules to decide active node and virtual attention status (for NNM)

| Judgment | | Active node | Virtual attention status | Camera input for participant i | Own screen |
|---|---|---|---|---|---|
| Eye gaze lost | | n | Inattentive | Follow Table 4 (k = n); Normal | Degraded |
| Eye gaze outside conference region | Encompasses one non-core camera | n | Inattentive | Follow Table 4 (k = n); Normal | Degraded |
| | Does not encompass any camera | No change | No change | No change | No change |
| Looking at node k | | k | Attentive | Follow Table 4; Normal | Normal |

Each terminal reports the gaze data to the central server 20, and the central server 20 will execute the rules and decide the active node and virtual attention status at the terminals 30.

Once the central server 20 has the active node and virtual attention status information, it will decide which camera input from a terminal will be displayed on other terminals. The matrix of Table 7 may be generated:

TABLE 7

Camera selection matrix

| Terminal of the display | Camera # at terminal1 | Camera # at terminal2 | . . . | Camera # at terminal j | . . . | Camera # at terminal N |
|---|---|---|---|---|---|---|
| 1 | Not needed | C21 | | . . . Cj1 | | . . . CN1 |
| 2 | C12 | Not needed | | . . . Cj2 | | . . . CN2 |
| . . . | . . . | . . . | | . . . . . . | | . . . . . . |
| i (i≠j) | C1i | C2i | | . . . Cji | | . . . CNi |
| . . . | . . . | . . . | | . . . . . . | | . . . . . . |
| N | C1N | C2N | | . . . CjN | | . . . Not needed |

In Table 7, Cji refers to the camera number at Terminal 30-*j* whose input will be displayed at Terminal 30-*i*. If i=j, no input is needed because a participant does not see himself in the virtual space 40.

All terminals 30 send inputs from the cameras to the central server 20. The central server 20 uses the matrix to synthesize the virtual views and sends synthesized images to each terminal for display.

The system 10 can be implemented at different levels of faithfulness, depending on the hardware and software that are used. Fully-loaded Mode (FLM) is the most demanding in terms of resources but can achieve mutual, partial, and full spatial faithfulness in a virtual space. FLM preserves information conveyed by facial expressions and upper body movement in all view angles. It uses 2N (or 2N−1 if full-back images are not used) cameras for each terminal 30 and requires a large physical space for each terminal.

Figure 12:
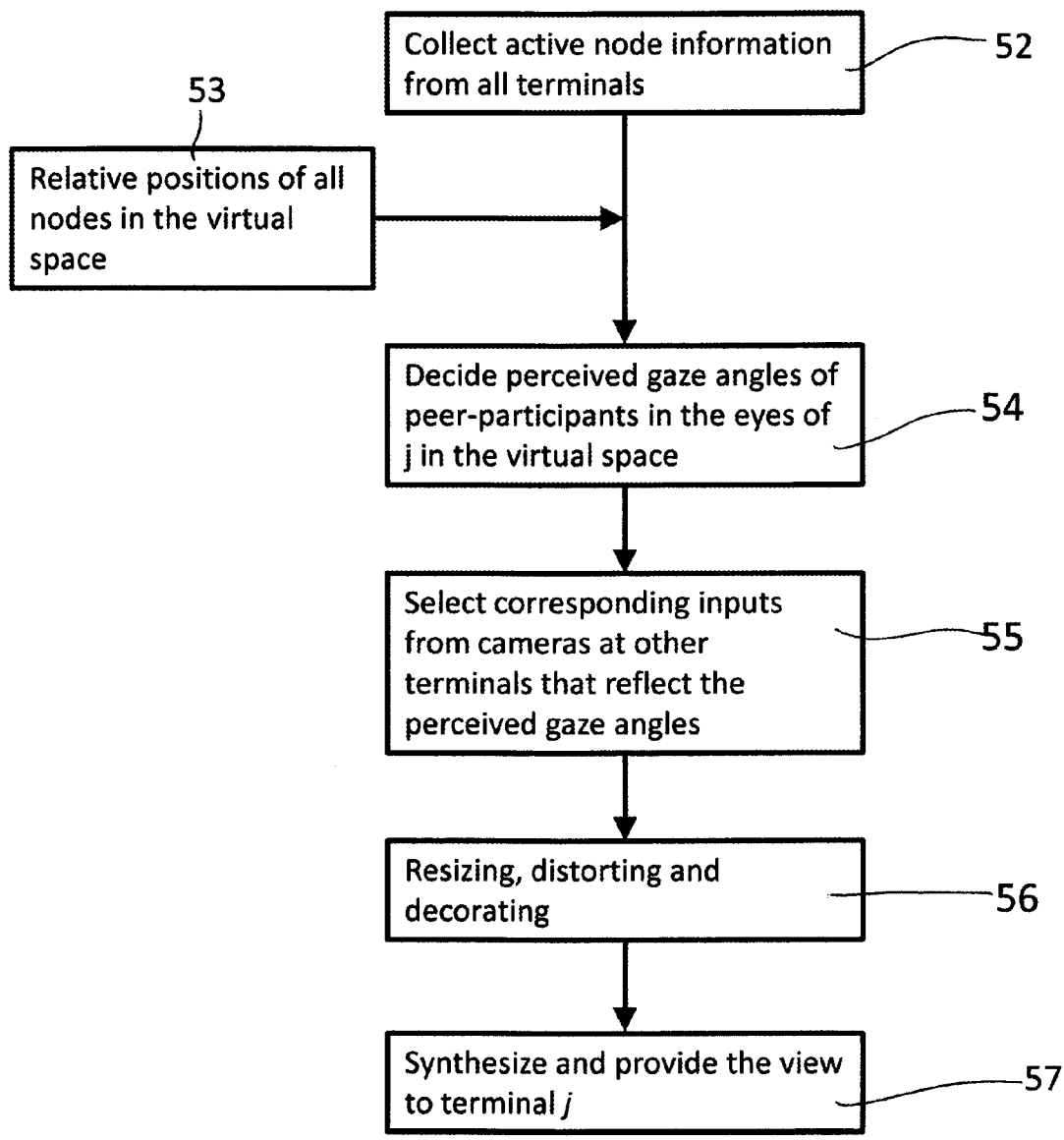
FIG. 12 is a flowchart summarizing the general procedure for realizing ANL, EGG, and EGC functions in a virtual conference system operating in fully-loaded mode.

FIG. 12 is a flowchart summarizing the general procedure for realizing ANL, EGG, and EGC functions in a virtual conference system operating in FLM. FIG. 12 depicts a virtual conferencing process 50 executed by the central server 20. The process entails collecting active node information from all the terminals 30 (step 52). The central server 20 also accesses the relative positions (e.g., order) in which the nodes in the virtual space are arranged (step 53). The central server then decides the perceived gaze angles of other participants in the eyes of Participant j in the virtual space (step 54). Then, the central server 20 selects the appropriate images from cameras at other terminals that reflect the perceived gaze angles properly (step 55). The images are then adjusted—e.g., resized, distorted, decorated, etc. to provide a more comfortable view for Participant j (step 56). The first-person view (where a participant does not see himself on the display device) is then constructed (step 57).

Figure 13:
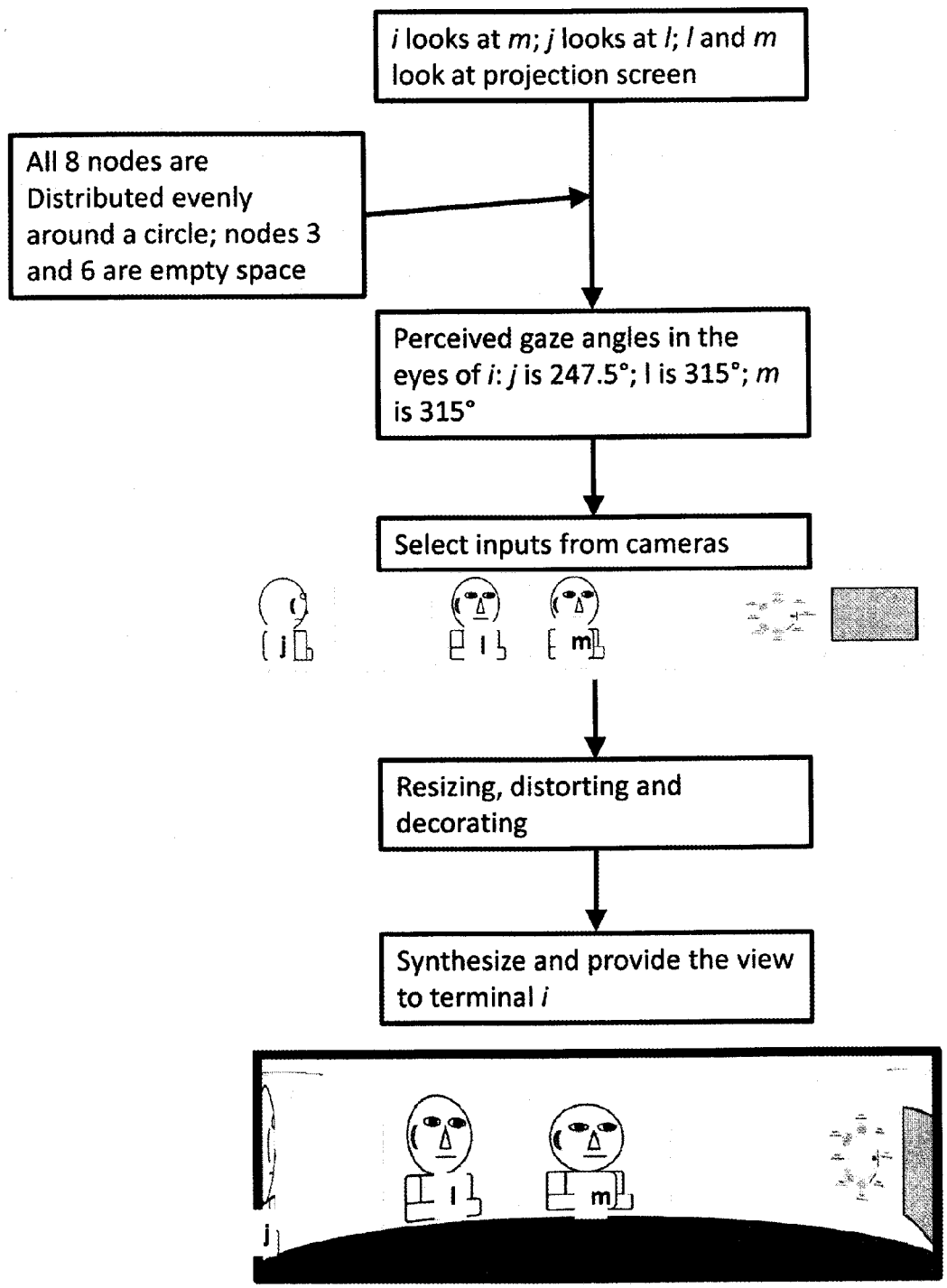
FIG. 13 depicts an example of the virtual conferencing process of FIG. 12 in the case of the embodiment shown in FIG. 8.

FIG. 13 gives an example of the virtual conferencing process 50 of FIG. 12 in the case of the embodiment of virtual space 40 shown in FIG. 8. As shown in FIG. 8, Participant i looks at Participant m, Participant j looks at Participant l, and Participants l and m look at the projection screen at Node o (collecting of active node information from all terminals, step 52). The relative positions of the nodes are determined in step 53—in the particular example, eight nodes are distributed evenly around a circle. Node k and Node n are empty spaces. The perceived gaze angles are then determined in step 54. From the perspective of Participant i, the perceived gaze angle of Participant j is 247.5°, the perceived gaze angle of Participant l is 315° and the perceived gaze angle of Participant m is also 315°. Appropriate images from each terminal that accurately reflects the perceived gaze angles are selected in step 55. The images are then adjusted in step 56, and provided to terminal i in step 57.

Based on images captured by the core camera and non-core cameras at a terminal 30, images reflecting extra perceived gaze angles can be generated with computer programs. For example, if two cameras captures images at 0° and 30° perceived gaze angles, respectively, images of perceived gaze angles between the two angles might be generated by a computer.

The system may be simplified to save cost, usually by sacrificing spatial faithfulness and non-verbal cues, for example by implementing the Half-loaded Mode (HLM), Degenerated Mode (DLM), and Mirroring, described below.

Half-Loaded Mode (HLM)

When the perceived gaze angle of Participant j in the eyes of Participant i is between 90° and 270° (i.e., Participant j looks like he is facing back as viewed by Participant i). Participant i sees a limited portion of Participant j's face. Most of the upper body movement of Participant j will also be blocked by Participant j's back. From a practical perspective, Participant i derives less information from facial expressions and upper body movements of Participant j.

Figure 14:
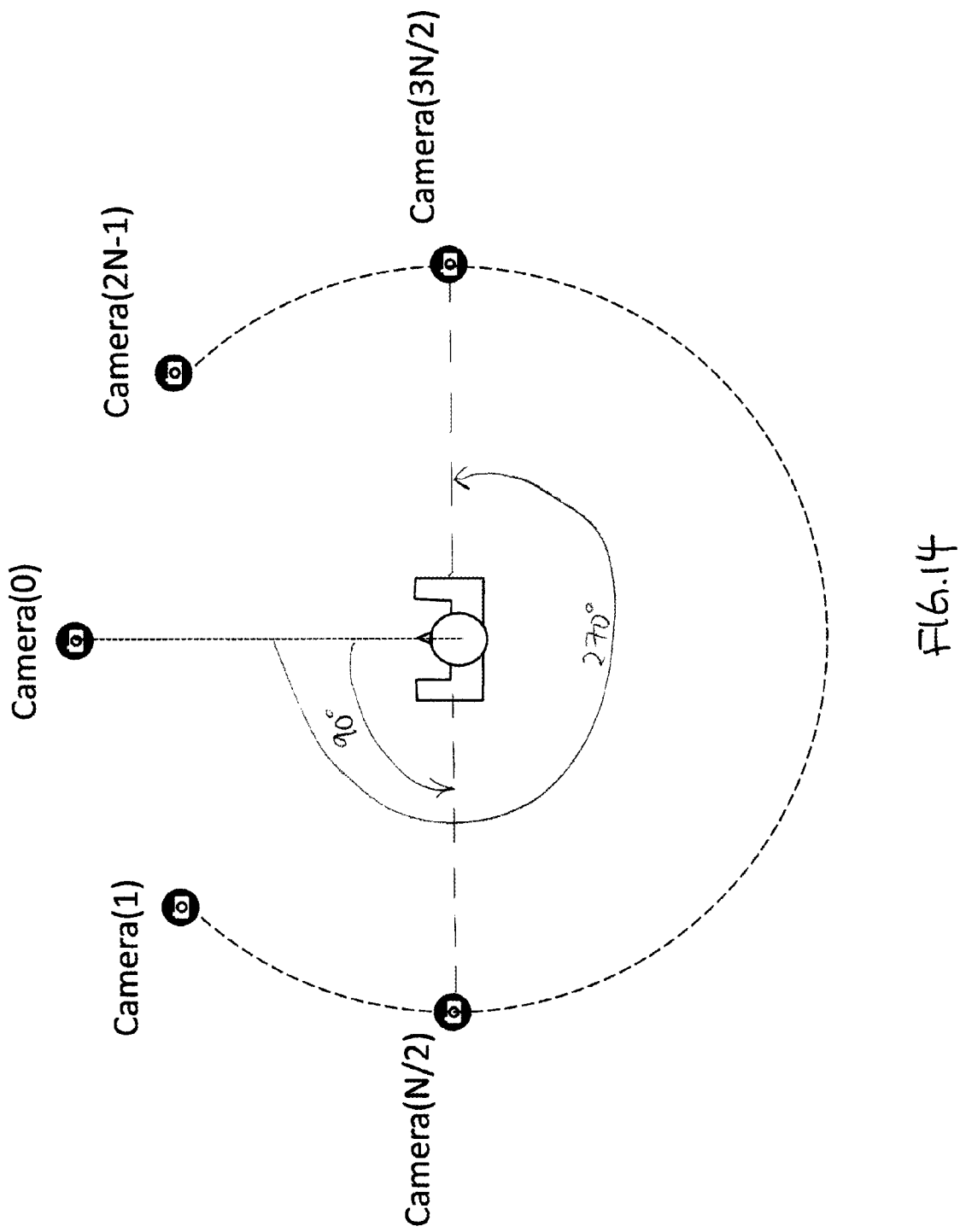
FIGS. 14 and 15 depict an example of a camera layout at a terminal operating in half loaded mode.
Figure 15:
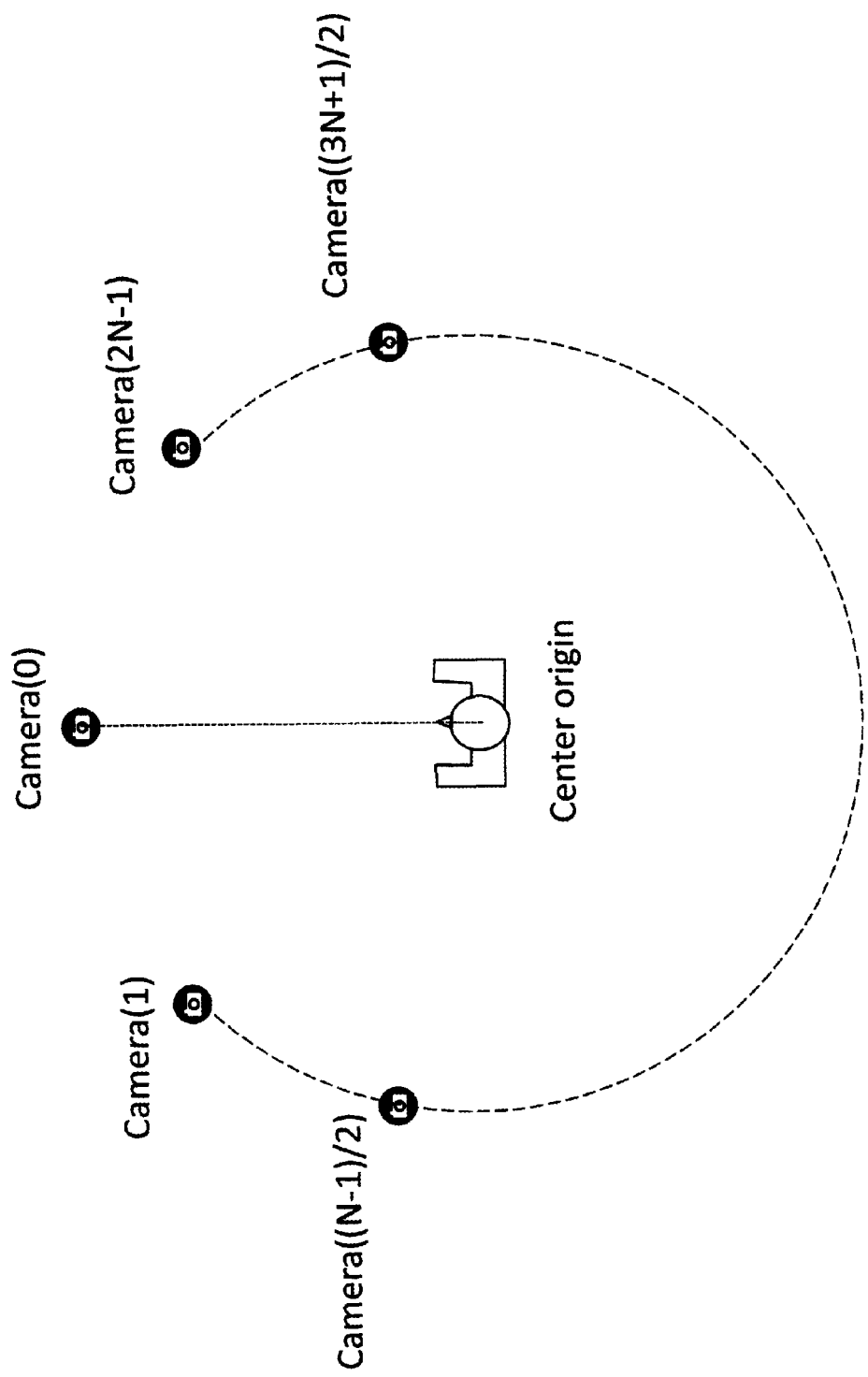

In HLM, N+1 (if N is an even number) or N (if N is an odd number) cameras are used, as shown in FIG. 14 and FIG. 15, respectively. Each participant takes photos for any perceived gaze angle that is larger than 90° and smaller than 270°. This can be done by asking the participant to face the leftmost camera once, and have all cameras on the right side capture his images, and then asking the participant to face the rightmost camera to have all cameras on the left side capture images. During the video conference, if the perceived gaze angle is larger than 90° and smaller than 270°, the corresponding pre-captured images will be displayed instead of real-time video streams.

Compared to FLM, HLM preserves partial and full spatial faithfulness but it loses facial expressions and upper body movement when a peer-participant's perceived gaze angle is between 90° and 270°. It requires fewer cameras and also less space. Since the pre-captured images are transmitted only once, the network traffic is also significantly reduced.

Degenerated Mode (DLM)

Figure 16:
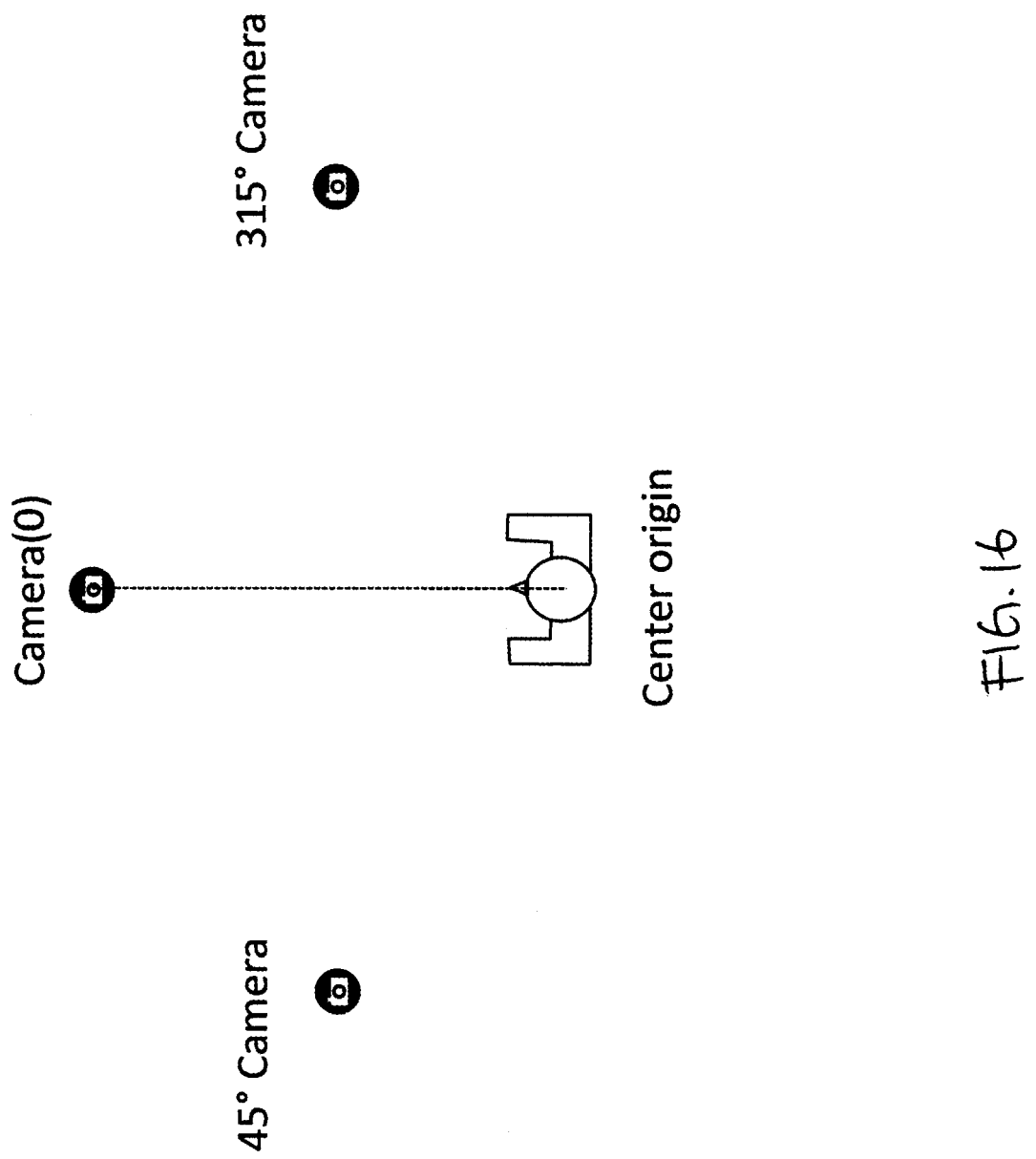
FIG. 16 depicts an example of a camera layout at a terminal operating in degenerated mode.

To preserve only partial spatial faithfulness, the number of cameras can be further reduced. For example, in a three-camera setup shown in FIG. 16, the cameras are placed at 0° (core camera), 45°, and 315°, respectively. The two non-core cameras will produce "looking-left" and "looking-right" images during the conference. Images the 45° camera produce will replace any images generated by camera (x) where 0<x<N/2, and images the 315° camera produce will replace any images generated by camera (x) where 3N/2<x<2N. Similar to the HLM case, each participant will be required to take images with perceived gaze angles of 90°, 135°, 225°, and 270° before the conference starts.

Compared to HLM, DLM does not preserve full spatial faithfulness in most cases. It also loses facial expressions and upper body movement when the perceived gaze angle is larger than or equal to 90° and less than or equal to 270°. Compared to HLM, however, DLM requires fewer (e.g., three) cameras and operates with significantly lower network traffic. The two non-core cameras do not have to be exactly at 45° or 315°. They can be positioned at other angles too as long as they generate looking-left and looking-right images when the participant looks at the core camera.

Mirroring

FIG. 17 illustrates mirroring of an image. Image from any non-core camera can be "reflected" horizontally to create a mirror image with symmetry. If the perceived gaze angle in an image is α, it will become 360°−α in the mirror image. Table 8 shows which photo or video should be used to display a view at specific perceived gaze angles. The values in Table 8 are obtained under the assumption that non-core cameras are positioned at angular positions less than 180° if mirroring is used. Similar results hold if all non-core cameras are positioned at angular positions larger than 180° in the mirroring mode.

TABLE 8

Sources for specific perceived gaze angles in different operating modes

| Perceived gaze angle α | FLM | HLM | HLM (Mirroring) | DLM | DLM (Mirroring) |
|---|---|---|---|---|---|
| α = 0° | V@(α, 0°) | V@(α, 0°) | V@(α, 0°) | V@(0°, 0°) | V@(0°, 0°) |
| 0° < α < 90° | V@(α, 0°) | V@(α, 0°) | V@(α, 0°) | V@(45°, 0°) | V@(45°, 0°) |

TABLE 8-continued

Sources for specific perceived gaze angles in different operating modes

| Perceived gaze angle α | FLM | HLM | HLM (Mirroring) | DLM | DLM (Mirroring) |
|---|---|---|---|---|---|
| α = 90° | V@(α, 0°) | V@(α, 0°) | V@(α, 0°) | P@(0°, 270°) | P@(0°, 270°) |
| 90° < α < 180° | V@(α, 0°) | P@(α − β, 360° − β) | P@(α − β, 360° − β) | P@(45°, 270°) | P@(45°, 270°) |
| α = 180° | Not needed | Not needed | Not needed | Not needed | Not needed |
| 180° < α < 270° | V@(α, 0°) | P@(α + β, β) | P@(360°− β − α, 360° − β)M | P@(315°, 90°) | P@(45°, 270°)M |
| α = 270° | V@(α, 0°) | V@(α, 0°) | V@(360° − α, 0°)M | P@(0°, 90°) | P@(0°, 270°)M |
| 270° < α < 360° | V@(α, 0°) | V@(α, 0°) | V@(360° − α, 0°)M | V@(315°, 0°) | V@(45°, 0°)M |

In Table 8, P@(A°, B°) refers to a photograph taken during calibration period from a camera positioned at angle A° while the participant looks at angle B°. V@(A°, B°) refers to video taken during conference from a camera positioned at an angle A° while the participant looks at an angle B°. If ANL and EGG functions work properly, B will be 0° most of the time during the conference call. P@(A°, B°)M and V@(A°, B°)M refer to horizontally reflected photo or video, respectively. If N is an even number, β=90° and if N is an odd number, β=(N−1)/N*90°.

Figure 18:
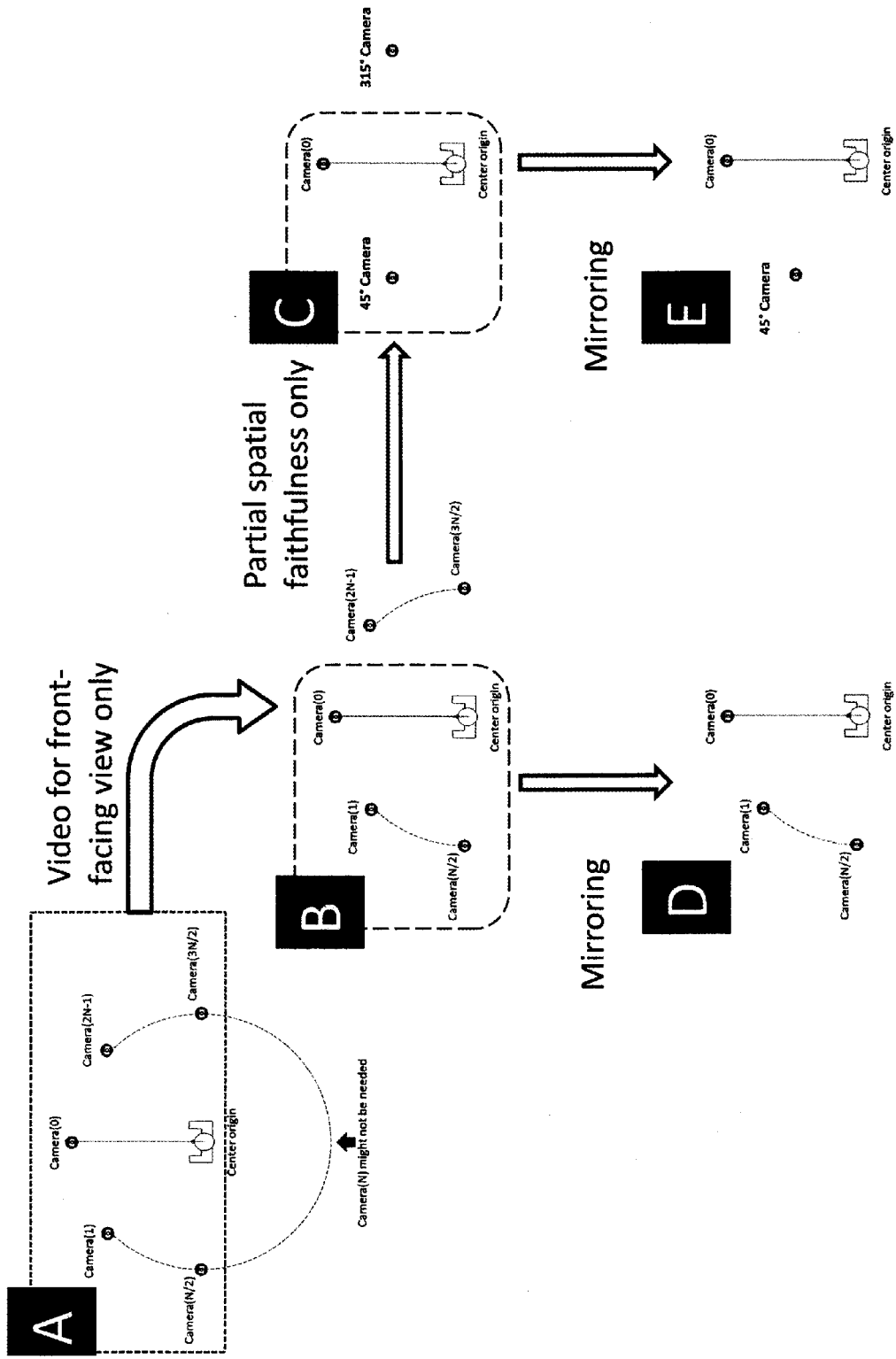
FIGS. 18 and 19 illustrate how different levels of complexity can be achieved.

Tables 9 and 10 compare some hardware and software implementations for systems operating in different modes. FIG. 18 and Table 9 illustrate a case where N is an even number. Case A is FLM where a total of 2N−1 cameras are required; 2N−1 video images will be captured for each participant. If videos for just the front-facing view are used, the system is reduced to HLM (Case B) in which N+1 cameras are used. N+1 video images will be captured for each participant. The space required is about half of that in FLM mode. If only partial faithfulness is to be preserved, the system is reduced to DLM (Case C) in which three cameras are required and three video images are captured for each participant. The space required is not significantly less than that of HLM. With mirroring, Case B and C can be further reduced to Case D and Case E, respectively. Mirroring reduces both the number of cameras required and the amount of space needed to implement the system (approximately by half).

Figure 19:
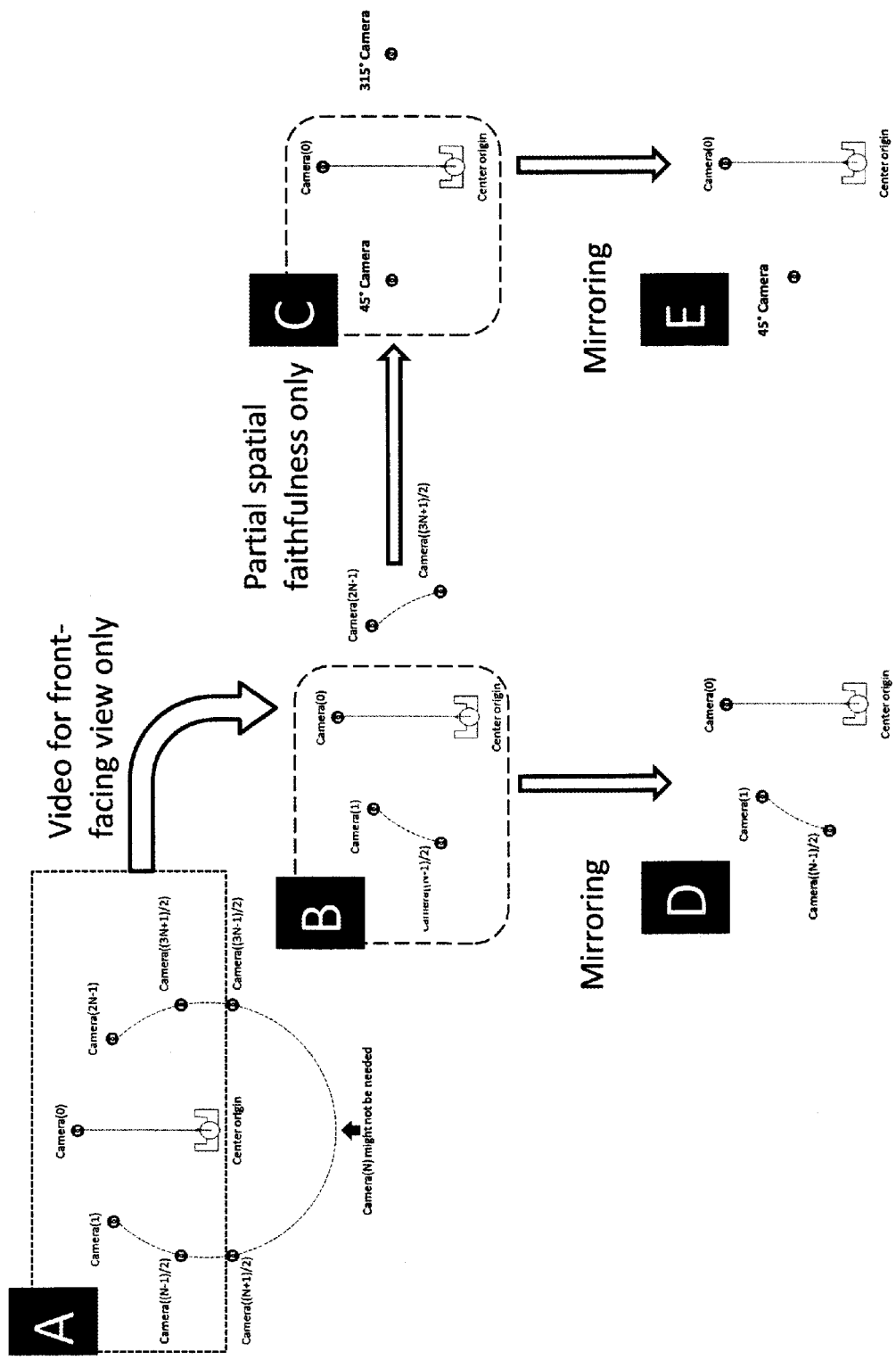

FIG. 19 and Table 10 illustrate a case where N is an odd number. Case A is FLM where a total of 2N−1 cameras are required and 2N−1 video images will be captured for each participant. If videos for just the front-facing view are used, the system is reduced to HLM (Case B) in which only N cameras are used and N video images are captured for each participant. The space required is about half of that in FLM. If only partial faithfulness is to be preserved, the system is reduced to DLM (Case C) in which only three cameras are used and three video images are captured for each participant. The space required for DLM does not change much relative to what is required for HLM. Mirroring reduces both the number of cameras used and the amount of space that is needed to implement the system (approximately by half).

TABLE 9

Comparison among systems in different operating modes (N is an even number)

|  | FLM | HLM | HLM (Mirroring) | DLM | DLM (Mirroring) |
|---|---|---|---|---|---|
| Number of cameras | 2N − 1 | N + 1 | N/2 + 1 | 3 | 2 |
| Camera angular positions | [0°, 360°) | [0°, 90°]; [270°, 360°); | [0°, 90°] | 0°, 45°, 315° | 0°, 45° |
| Relative space required | 1 | ~½ | ~¼ | ~½ | ~¼ |
| # of videos per participant | 2N − 1 | N + 1 | N/2 + 1 | 3 | 2 |
| # of photos per participant | 0 | N − 2 | N/2 − 1 | 4 | 2 |

TABLE 10

Comparison among systems in different operating modes (N is an odd number)

|  | FLM | HLM | HLM (Mirroring) | DLM | DLM (Mirroring) |
|---|---|---|---|---|---|
| Number of cameras | 2N − 1 | N | (N + 1)/2 | 3 | 2 |
| Camera position | [0°, 360°) | [0°, β] [360° − β, 360°); | [0°, β] | 0°, 45°, 315° | 0°, 45° |
| Relative space required | 1 | ~½ | ~¼ | ~½ | ~¼ |
| # of videos per participant | 2N − 1 | N | (N + 1)/2 | 3 | 2 |
| # of photos per participant | 0 | N − 1 | (N − 1)/2 | 4 | 2 |

Dual-Camera Mode (DCM)

The modes described above attempt to preserve at least partial faithfulness. If mutual faithfulness is desired, the system can be further simplified. A DCM system requires two cameras. Unlike DLM (Mirroring), DCM does not synthesize images reflecting a virtual space because partial or full spatial faithfulness is not being considered. Also, unlike in DLM, node positioning consistency is not always preserved in DCM. In short, DCM uses ANL and EGG functions. DCM may be implemented, for example, with laptop computers or smart phones.

Figure 20:
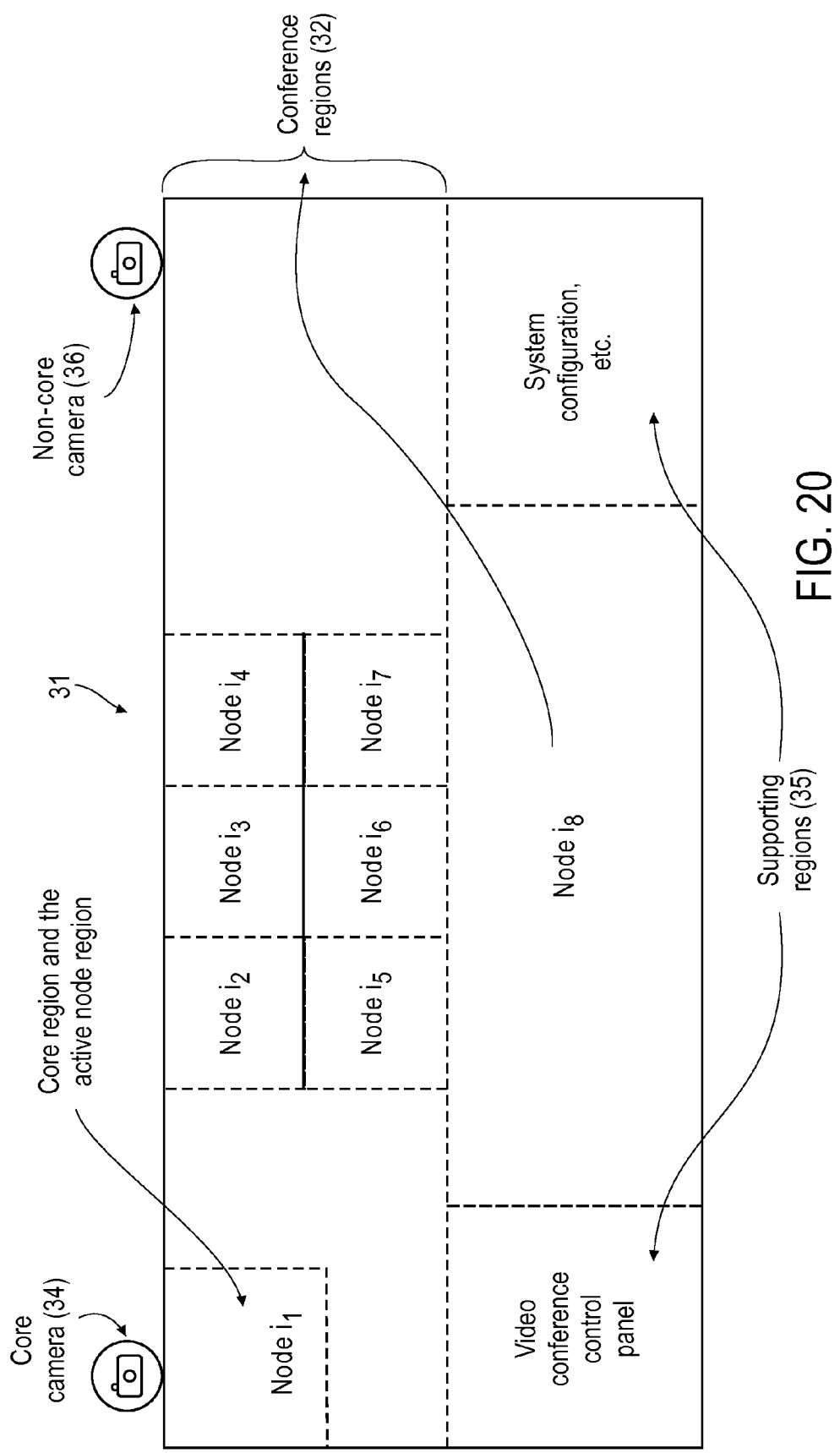
FIG. 20 depicts a display device at a terminal operating in dual-camera mode.

FIG. 20 depicts a display device 31 in DCM. In this mode, the core camera 34 is placed close to the visible region of the screen to ensure that when the participant is looking at a screen area near the core camera, the core camera will capture watching-you images. A non-core camera 36 may be positioned a preset distance from the screen.

In this mode, the small area on the screen that is close to the core camera 34 is the core region which, as described above, is used to display image of the active node (usually the gaze recipient). The images from other nodes will be displayed in some other designated areas (non-core regions) on the screen. The non-core regions should be separated from the cameras 34 and 36 so that the participant will appear to be watching elsewhere in both cameras when he is looking at the non-core regions. To enable collaboration using a shared platform such as presentation projection screen or white board, one of the non-core regions will be designated as a shared region where the projection screen or white board will be displayed (node $i_8$ in FIG. 20).

In automatic detection mode, an eye gaze-tracking system may be used to detect which node/region the participant is looking at. In DCM with manual intervention, only one region on the screen is not degraded at any given moment. During the video conference, without any active interference from the input device, depending on the choice of the participant, either the core region or the shared region is not degraded. Since other regions are degraded, the participant uses the input device to instruct the system to recover another region he wants to look at. For example, the participant may use a mouse to move a cursor on the screen and, if the cursor stays in a certain region longer than a predetermined length of time, the corresponding node will be designated as the active node. If that active node is a human participant, the node will be displayed in the core region and the core region will be recovered. Other nodes will move accordingly. If that active node is a shared platform such as a projection screen or a whiteboard, the shared region will be recovered.

At each terminal 30, the status of the screen and the input from manual intervention are continuously monitored. Based on the feedback, the system will select an image from one of the cameras to be displayed on the screen of other participants.

TABLE 11

Selection of camera in dual camera mode

| Status of j | Recovered Node | Display at participant k (k ≠ i) | Display at participant k (k = i) |
|---|---|---|---|
| Transition | Node i (in non-core region) or lifeless node | j's non-core camera (Case A) | j's non-core camera (Case E) |
|  | Node i (in core region) | j's non-core camera (Case B) | j's core camera (Case F) |
| Not in transition | Node i | j's non-core camera (Case C) | j's core camera (Case G) |
|  | Lifeless node | j's non-core camera (Case D) | j's non-core camera (Case H) |

When system relies on manual intervention for ANL, mutual faithfulness could be compromised in following two scenarios in Table 11:
1. Between Participant j and Participant k in cases A, B, C, D, and H of Table 11, whenever Participant j looks into the non-core camera, Participant k would incorrectly think Participant j is looking at him.
2. Between Participant j and Participant k in case E of Table 11, Participant j is looking at Participant i but neither the core camera nor the non-core camera captures watching-you images.

Since, by design, the non-core camera will be positioned at a distance from any meaningful display content, scenario 1 is unlikely to occur often. Scenario 2 is expected to occur frequently during transition period. However, since transition period is short, the compromise of mutual faithfulness is momentary.

Although DCM is not designed to provide partial and full spatial faithfulness, some enhancement can be added to the system to reveal who is looking at whom, by utilizing the ANL information from the terminals 30. For example, text can be displayed whenever a node is recovered to show which node the corresponding participant is looking at.

Figure 21:
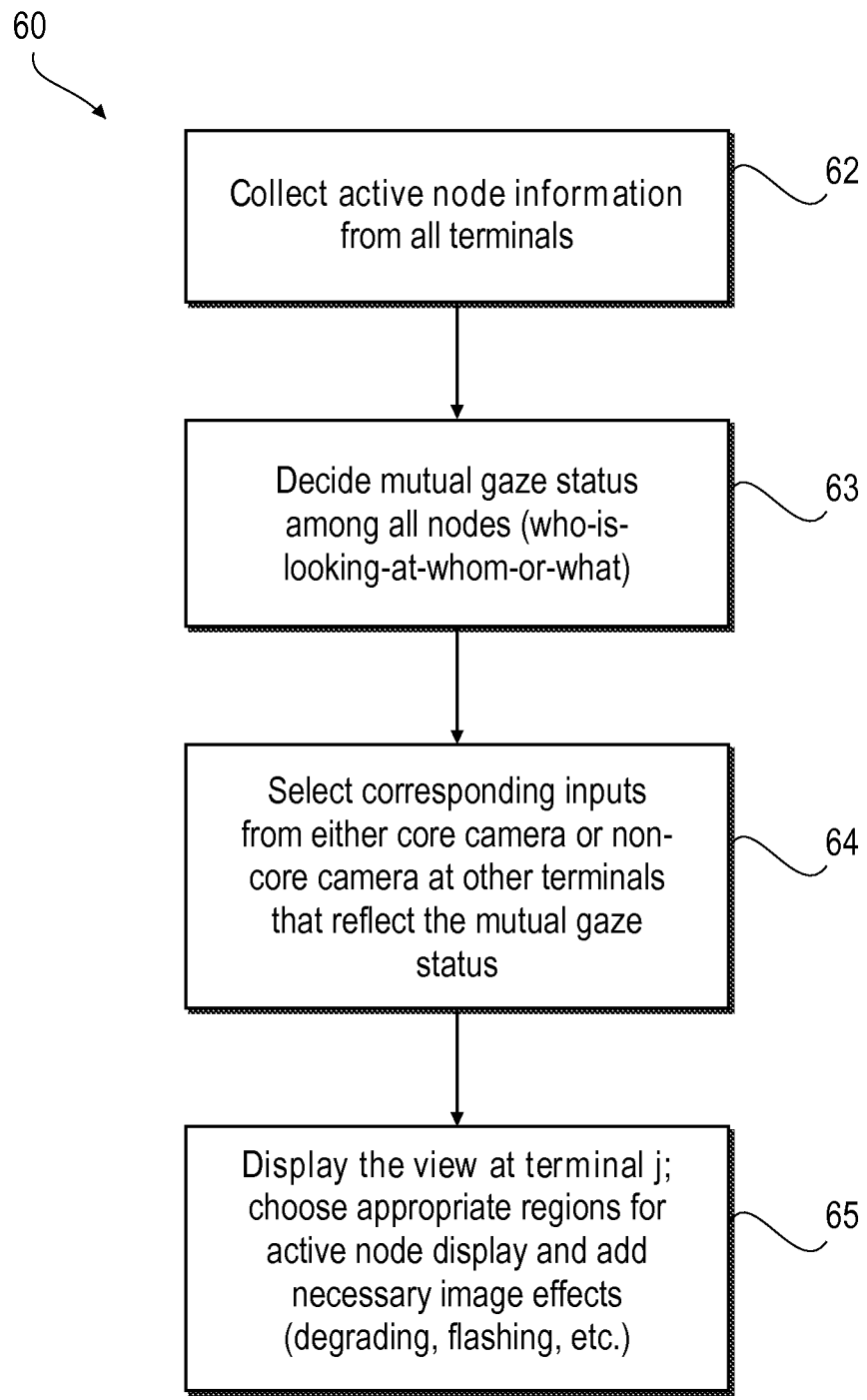
FIG. 21 depicts the process of realizing ANL and EGG functions in dual-camera mode.

FIG. 21 is a flowchart depicting a DCM virtual conferencing process 60 in accordance with the invention. In the process, the central server 20 collects active node information from all terminals (step 62). The central server 20 decides mutual gaze status among the nodes (step 63), then selects corresponding inputs from either the core camera or the non-core camera at other terminals, depending on which input more accurately depicts the mutual gaze status (step 64). The selected images are then displayed at terminal j (step 65). Image effects such as degrading, flashing, etc. may be applied.

In Active Node Hint (ANH) method, a new display state, called "flashing," will be introduced to indicate a transition between the "degraded" mode and "recovered" mode. When a region is "flashing," it will be displayed at normal display quality with some special effects (e.g., extra lighting, blinking, etc.) initially, and then the image will fade gradually to degraded state. The flashing lasts a short time so that the participant is able to focus on the recovered node.

If a participant is expected to be looking at only one object at any particular moment, at each terminal there should be no more than one region on the screen that is in flashing state. Flashing in one region will be put to an end if the system decides to start flashing in another region.

ANH will not be activated whenever the recovered node is a lifeless node, or if the participant in recovered node is looking at Participant j. A "lifeless node" may be an object, such as a projection screen, white board, an empty seat, etc. In ANH, flashing may occur on Participant j's screen in the following situations:
1. When node i is recovered (k is the recovered node on Participant i's screen) and j≠k, node k will be flashing.
2. The currently recovered node is i. Whenever the recovered node on Participant i's screen switches to a new node k and j≠k, node k will be flashing.
3. The currently recovered node is i, k is the recovered node on Participant i's screen, and j≠k. Whenever the participant signals the system to do flashing, node k will be flashing.

ANH enables Participant j to know whom Participant i is looking at whenever Participant i recovers a node. It notifies the host participant if the peer-participant in the recovered region switches focus. It also allows the host participant to proactively obtain information about who is displayed in the recovered region of the peer participant in the recovered region.

ANH enables the participant to know the active nodes of other peer participants. Another useful piece of information the participant may want to obtain is "who is looking at me." To achieve that, the region whose corresponding peer-participant is looking at Participant j can be marked different than another region, for example with a small flag icon, with a different colored border, etc.

Mixed Mode (MXM)

Some of the above operating modes can be integrated into a single system. In an exemplary mixed-mode (MXM) system, some of the terminals are equipped with hardware and software to run FLM while others are equipped with hardware and software to run DCM. In the following discussion, an "FLM participant" refers to a participant who operates in FLM and a "DCM participant" refers to a participant who operates in DCM.

Figure 22:
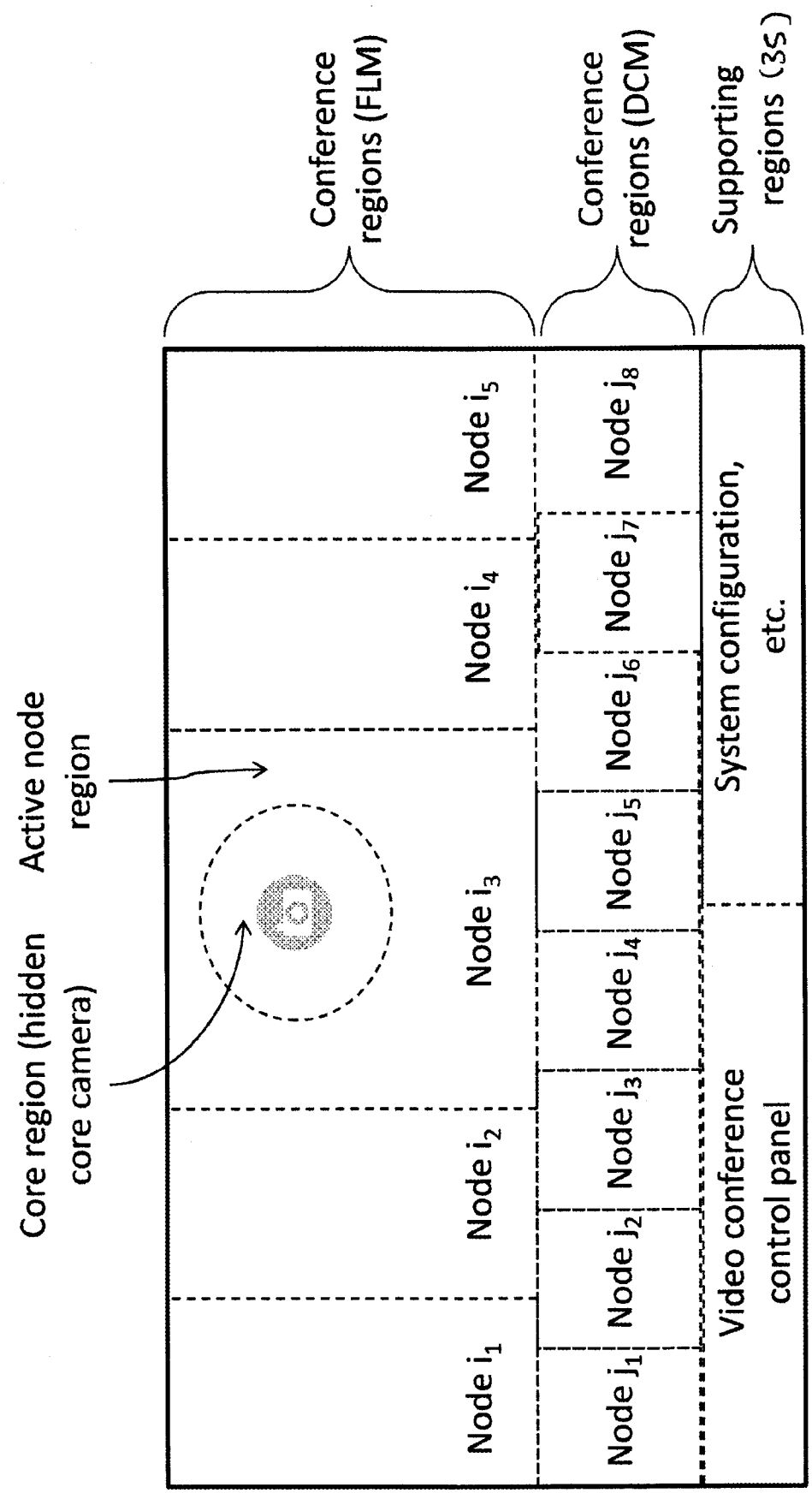
FIG. 22 depicts a display device at a terminal operating in mixed mode.

To integrate both modes into a single system, some modifications are made to the FLM terminals. Specifically, the screen at FLM terminals will be modified so that conference regions will be divided into FLM and DCM regions, as shown in FIG. 22. An empty space may be reserved in the virtual space for FLM, to create a gaze direction for any FLM participant who looks at a DCM participant. For DCM participants, all FLM participants will appear on the screens as if they were DCM participants. The core camera and one non-core camera images from each FLM participant will be sent to DCM participants.

For any FLM participant, all other FLM participants will appear on the screen the same way as they were in a pure FLM mode. If any FLM participant looks at a DCM participant, he will be shown on the screens of other FLM participants as if he is looking at the empty space. All DCM participants will appear in the DCM conference region. If a DCM participant looks at the FLM participant, watching-you images of the DCM participants will be shown on the screen of the FLM participant. Otherwise, watching-elsewhere images will be shown (see Table 12).

will be shown to sit between Participants i and k on the display at any terminal (except for terminal j where Participant j is not shown). However, depending on the specific terminal and gaze information, Participant j can be sitting further away from Participant i or closer to Participant i.

In the example embodiment of FIG. 23A, there are eight nodes: nodes i, j, k, l, m, n, o, and p. In DDM, the layout may change from terminal to terminal and, even for the same terminal, the view may change depending on gaze information. In FIG. 23A, Participant i is looking at Participant k, Participant j is looking at Participant i, Participant k is looking at Participant l, Participant l is looking at Participant k, Participant m is looking at Node l and Participant n is looking at Participant o. In DDM, dynamic adjustments are made so that the layout will be consistent with the perceived gaze angle of the peer participant in active node. Synthesized views reflecting the layout of FIG. 23B are displayed at terminal i, and synthesized views reflecting the layout of FIG. 23C are displayed at terminal j. In DDM, three cameras are used (one core and two non-core cameras). As a result, for each participant, videos reflecting three gaze angles ($\alpha$, $0°$, and $360°-\alpha$) will be captured. In the case of eight nodes, it may not be possible to achieve full gaze faithfulness with

TABLE 12

Perceived gaze angle and gaze directions in the mixed mode

| | In the eyes of | | | |
|---|---|---|---|---|
| | The FLM participant being looked at | Other FLM participants | The DCM participant being looked at | Other DCM participants |
| FLM participant i looks at FLM participant j | i watching me | i watching j | | i watching elsewhere |
| FLM participant i looks at DCM participant n | | i watching empty space | i watching me | i watching elsewhere |
| DCM participant m looks at FLM participant j | m watching me | m watching elsewhere | | m watching elsewhere |
| DCM participant m looks at DCM participant n | | m watching elsewhere | m watching me | m watching elsewhere |

Multi Row Mode (MRM)

Background extraction technology may be used to extract or cut out a participant's image. This way, background images such as furniture, decorations on the wall, etc. may be eliminated. This technology makes it possible to overlap images to create a multi-row virtual space. As the geometry of circular conference table shown in FIG. 4 is not preserved in this mode, the number of cameras at each terminal may have to be adjusted to achieve high resolution when realizing spatial faithfulness.

Dynamic Degenerated Mode (DDM)

The operation modes described above assume that participants remain in the same virtual location in the virtual space 40. In DDM, this assumption no longer holds. In DDM, relative positions (e.g., order) of participants around a circle will still be kept constant throughout the conference. However, the distance between adjacent participants is adjusted dynamically. "Dynamically," as used herein, is intended to mean real-time (e.g., every time a judgment is made, when there is a change in the active node, when there is a change in the gaze recipient), as the image is generated for display. For example, if Participant j is supposed to be sitting between Participant i and Participant k, Participant j three cameras. The positioning of the cameras will determine the perceived gaze angles of the participant in the images captured by the cameras and these perceived gaze angles will dictate the dynamic layouts. As an example, an $\alpha$ value of $60°$ is used in the following discussion.

Figure 24:
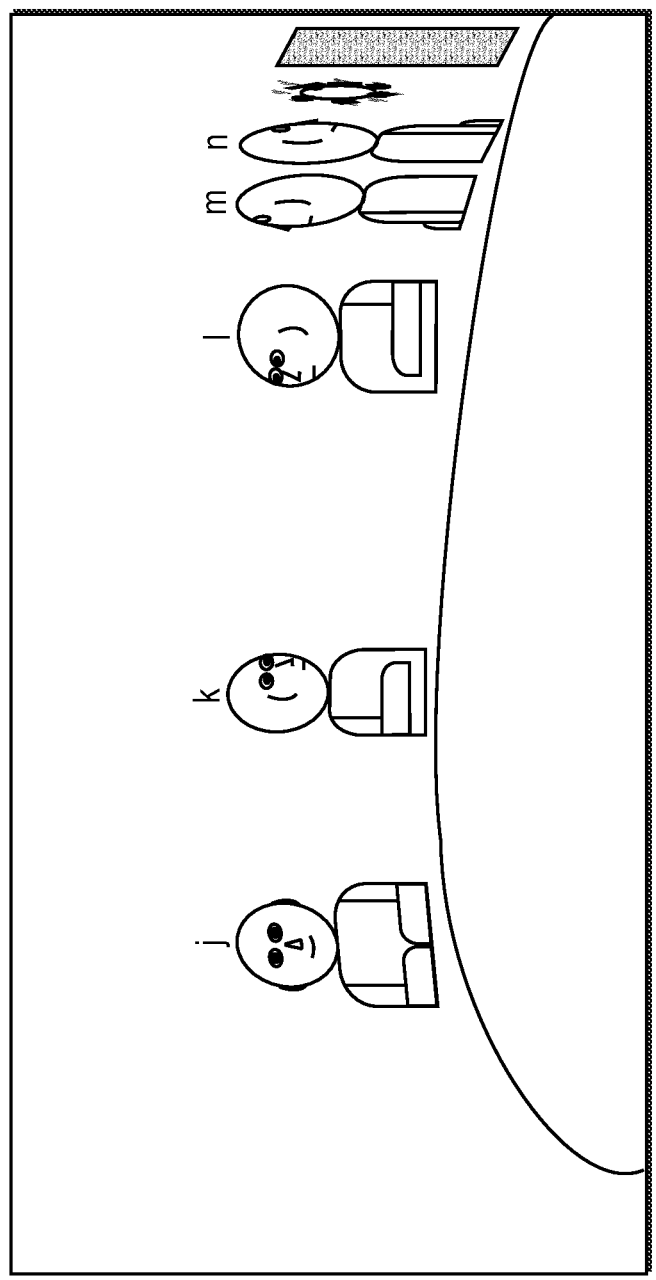
FIGS. 24 and 25 show the synthesized views of Participant i and Participant j for the case described in FIGS. 23B and 23C, respectively.
Figure 25:
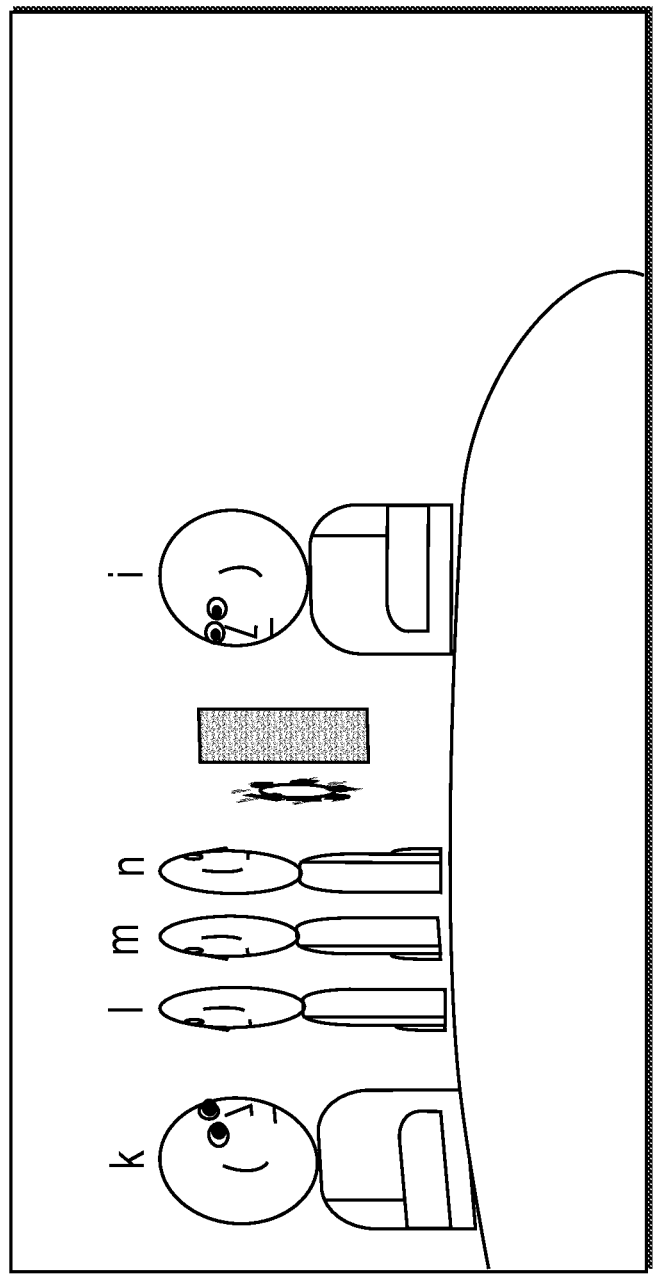

The purpose of dynamic adjustment of layout is to guarantee the full gaze faithfulness of the peer participant at the active node. For all other participants, partial gaze faithfulness can be achieved. If the peer participant in active node is not looking at the host participant, the node the peer participant in the active node is looking at will be positioned at a point on the imaginary circle $30°$ to the right of the host participant in the virtual space if the peer participant in the active node is looking left (i.e., perceived gaze angle=$300°$). The angle $30°$ is defined with respect to an imaginary line that connects the position of the host participant to the center of the imaginary circle. On the other hand, if the peer participant in the active node is not looking at the host participant but is looking to the right (i.e., perceived gaze angle=$60°$), the node the peer participant in the active node is looking at will be positioned at a point on the circle $30°$ to the left of the host participant in the virtual space. The positioning of the peer participant in the active node is more flexible. However, in a simple embodiment, the peer participant in the active node can be positioned so that the host participant, the peer participant in the active node, and the node the peer participant in the active node is looking at form an equilateral triangle in the virtual space. Then, all other nodes can be "squeezed" into the remaining space without changing their relative positions. FIG. 24 and FIG. 25 show the synthesized views of Participant i and Participant j for the case described in FIG. 23B and FIG. 23C, respectively. In FIG. 23B, Participant i is the host participant and in FIG. 23C, Participant j is the host participant. In FIG. 24 and FIG. 25, partial gaze faithfulness is preserved for the "squeezed" nodes.

If the system determines that the peer participant in the active node is looking at the host participant, the situation will be simpler than what is described above. Because the gaze recipient of the peer participant in the active node is the host participant, there is no specific restrictions other than that the dynamic layout should make sure that relative positions among participants are consistent.

Figure 26A:
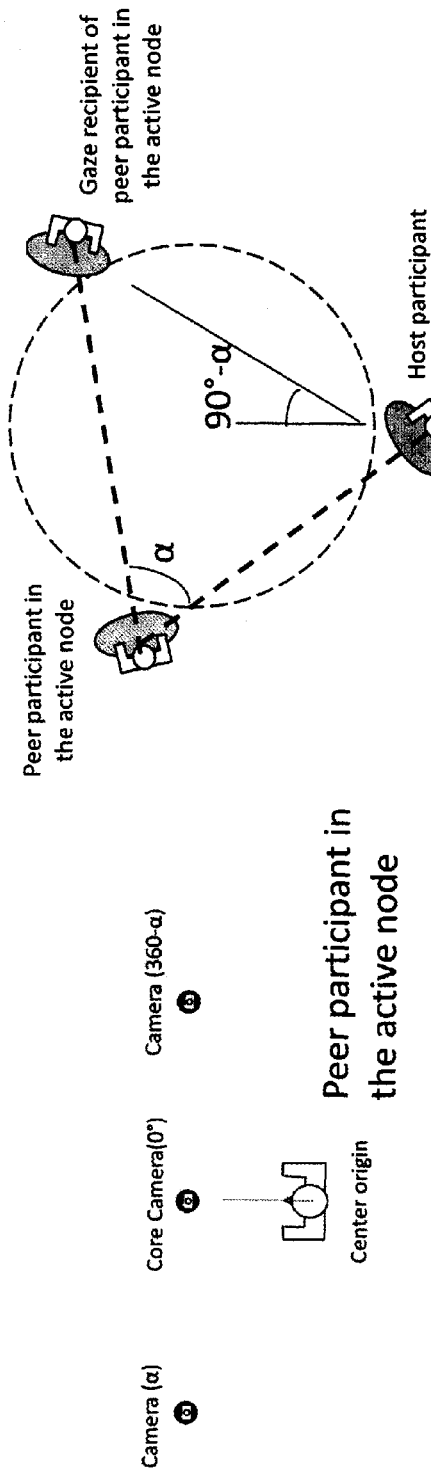
FIGS. 26A, 26B, and 26C depict an exemplary way of positioning the representations of the participants in the virtual space when operating in Dynamic Degenerated Mode.
Figure 26B:
Figure 26C:
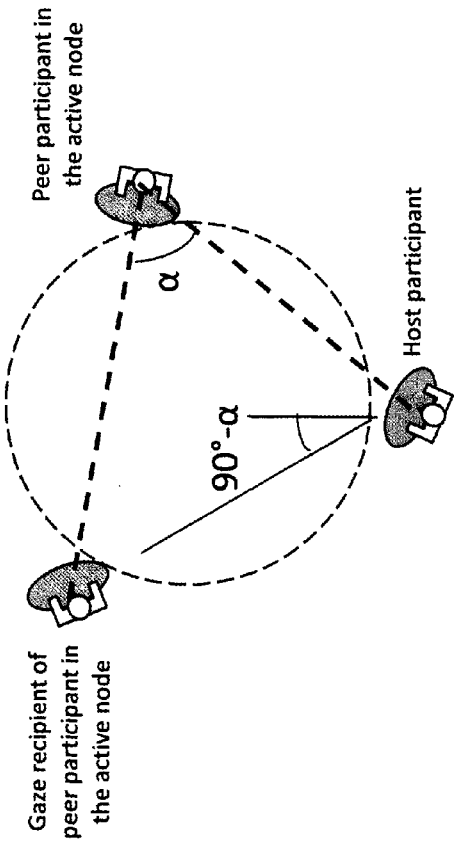

In general, if the cameras are positioned in such a way that images reflecting three gaze angles ($\alpha$, $0°$, and $360°-\alpha$) are captured ($0°<\alpha<90°$), as shown in FIG. 26A, the virtual layout will follow what is depicted in FIG. 26B and FIG. 26C if the peer participant in the active node is not looking at the host participant. As shown in FIG. 26B, if the peer participant in the active node is looking left (i.e., perceived gaze angle=$360°-\alpha$), the node the peer participant in the active node is looking at will be positioned at a point on the circle $90°-\alpha$ to the right of the host participant in the virtual space. The angle $90°-\alpha$ is defined with respect to an imaginary line that connects the position of the host participant to the center of the imaginary circle. Similarly, as shown in FIG. 26C, if the peer participant in the active node is looking right (i.e., perceived gaze angle=$\alpha$), the node the peer participant in the active node is looking at will be positioned at a point on the circle $90°-\alpha$ to the left of the host participant in the virtual space. The positioning of the peer participant in the active node is more flexible as long as relative positions among the participants remain consistent. Then other nodes can be squeezed into the remaining space with relative positions among the participants kept consistent.

Embodiments of the invention and all of the functional operations described in this specification can be implemented in digital electronic circuitry, or in computer software, firmware, or hardware, including the structures disclosed in this specification and their structural equivalents, or in combinations of one or more of them. The central server of the invention can be implemented as a combination of computer hardware including a processor and a memory with one or more computer program products, i.e., one or more modules of computer program instructions encoded on a computer-readable medium for execution by, or to control the operation of, data processing apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction among terminals 30, embodiments of the invention can be implemented using a computer having a display device, e.g., a CRT (cathode ray tube), LCD (liquid crystal display), projection screen, OLED display, 3D display, etc. for displaying information to the participants. A keyboard and a pointing device, e.g., a mouse or a trackball, by which a conference participant can provide input to the computer are also provided. Other kinds of devices can be used to provide for interaction with participants as well; for example, feedback provided to the player can be any form of sensory feedback, e.g visual feedback, auditory feedback, or tactile feedback; and input from the player can be received in any form, including acoustic, speech, brain waves, other physiological input, eye movements, gestures, body movements, or tactile input.

Embodiments of the invention can be implemented in a computing system that includes a back-end component, e.g., as the central server 20, or that includes a middleware component, e.g., an application server, or that includes a front-end component, e.g., a computer at a terminal 30 having a graphical player interface or a Web browser through which a player can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The virtual conferencing system 10 can include clients and servers. A client and server are generally remote from each other and typically interact through a communication network. In the example embodiments presented above, the terminals 30 may be a type of "client." The relationship of client and server arises by virtue of computer programs running on the respective computers and having a client-server relationship to each other.

While this specification contains many specifics, these should not be construed as limitations on the scope of the invention or of what can be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated together in a single software product or packaged into multiple software products.

It should be understood that the invention can be practiced with modification and alteration within the spirit and scope of the appended claims. The description is not intended to be exhaustive or to limit the invention to the precise form disclosed. It should be understood that the invention can be practiced with modification and alteration.

What is claimed is:

1. A computer-implemented method of executing a virtual conference among a first node, a second node, and a third node, comprising:
    receiving input indicating a gaze recipient of a first participant associated with the first node, wherein the gaze recipient is associated with one of the second and third nodes;
    designating the gaze recipient as an active node for the first participant, thereby causing an image of the gaze recipient to be displayed in an active node region viewable by the first participant, and wherein the active node region is fixed at a position close to or encompassing an image capturing device such that the image capturing device captures a watching-you image of the first participant if the first participant looks at the active node region; and
    dynamically changing the image in the active node region to an image of a different participant in response to change of gaze recipient.

2. The method of claim 1 further comprising:
    constructing a virtual space in which representations of the first participant, a second participant who is associated with the second node, and a third participant who is associated with the third node are positioned in a predetermined order;
    obtaining images of the first participant from different angles; and
    selecting one of the images that properly portrays the first participant as looking at his gaze recipient in the virtual space; and
    transmitting the selected image of the first participant to the second node.

3. The method of claim 2, wherein the first participant's gaze recipient is the third participant, further comprising positioning the representation of the third participant to the right of the representation of the second participant by an angle $\alpha$ in the virtual space if the first participant is looking left, wherein $0° < \alpha < 90°$ and $\alpha$ is measured with respect to an imaginary line between the representation of the second participant and the center of an imaginary circle on which the representations of the first, second, and third participants lie.

4. The method of claim 2, wherein the first participant's gaze recipient is the third participant and wherein the representations of the first participant, the second participant, and the third participant are positioned in the virtual space to form an equilateral triangle.

5. The method of claim 2, wherein the first participant's gaze recipient is the third participant, further comprising positioning the representation of the third participant to the left of the representation of the second participant by an angle $\alpha$ in the virtual space if the first participant is looking right, wherein $0° < \alpha < 90°$ and $\alpha$ is measured with respect to an imaginary line between the representation of the second participant and the center of an imaginary circle on which the representations of the first, second, and third participants lie.

6. The method of claim 2, wherein the obtaining comprises capturing images of the first participant with a plurality of image capturing devices that are located at predetermined positions relative to the first participant, wherein the image capturing devices include the image capturing device that is positioned in or close to the active node region.

7. The method of claim 6, wherein said capturing is done simultaneously by the plurality of image capturing devices.

8. The method of claim 1, wherein receiving input from the first participant comprises:
    tracking the first participant's gaze via a gaze tracking mechanism to determine which region of a display device the first participant is looking at.

9. The method of claim 1 further comprising generating a representation of a virtual space that includes the first participant, a second participant, and a third participant positioned in a predetermined order, wherein the dynamic changing of the gaze recipient in the active node region comprises shifting the representation of the virtual space.

10. The method of claim 9 further comprising adjusting the representation of the virtual space by performing one or more of resizing, distorting, and adding elements to a part of the representation.

11. The method of claim 9, wherein the order in which the first, second, and third participants are arranged in the representation remains constant.

12. A computer-implemented method of executing a virtual conference including a first node and a second node, wherein the first node is associated with a first participant looking at a first gaze recipient and the second node is associated with a second participant looking at a second gaze recipient, comprising:

receiving input from the first node indicating that the second participant is the first gaze recipient, wherein the second participant is displayed on a first display device at the first node;

positioning image of the second participant in an active node region on the first display device, wherein the active node region is fixed at a position close to or encompassing an image capturing device such that the image capturing device captures a watching-you image of the first participant if the first participant looks at the active node region;

obtaining the watching-you image of the first participant; and transmitting the watching-you image of the first participant to the second node.

13. The method of claim 12 further comprising degrading the image of a participant other than the first participant's gaze recipient, to encourage the first participant to look at the active node region.

14. The method of claim 12 further comprising providing an image of a third participant to the active node region upon receiving the input from the first participant that the gaze recipient changed to the third participant.

15. The method of claim 12, wherein the input is received from an eye gaze tracking device.

16. The method of claim 14 further comprising providing an image of the first participant to be displayed on a second display device at the second node, wherein the image shows the first participant looking in the direction of first participant's gaze recipient.

17. A computer-implemented method of executing a virtual conference among a plurality of nodes, wherein one of the nodes is associated with a host participant and other nodes are respectively associated with peer participants, comprising:

constructing a virtual space in which representations of the host participant and the peer participants are positioned in a predetermined order;

providing a representation of the virtual space to the node that is associated with the host participant, wherein the representation is dynamically adjusted to include different sections of the virtual space depending on who the host participant's gaze recipient is, wherein the dynamic adjustment of the representation is done to display the host participant's gaze recipient in an active node region viewable by the host participant, and wherein the active node region is fixed at a position close to or encompassing an image capturing device such that the image capturing device captures a watching-you image of the host participant if the host participant looks at the active node region.

18. A virtual conferencing system comprising:

a central server;

a host terminal configured to report to the central server a first gaze recipient of a host participant and transmit images of the host participant captured from different angles;

peer terminals configured to report to the central server gaze statuses of respective peer participants at the peer terminals and transmit to the central server images of the peer participants obtained from different angles, wherein the central server is configured to designate the first gaze recipient as an active node for the host terminal, thereby causing an image of the first gaze recipient to be displayed in an active node region at the host terminal, and wherein the active node region is fixed at a position close to or encompassing an image capturing device such that the image capturing device captures a watching-you image of the host participant if the host participant looks at the active node region; and dynamically changing the image in the active node region to an image of one of the peer participants in response to change of first gaze recipient.

19. The virtual conferencing system of claim 18, wherein the dynamic changing of the image in the active node region to an image of one of the peer participants is done in response to detecting that the one of the peer participants is the gaze recipient.

20. The computer-implemented method of claim 1, wherein the dynamic changing of the image in the active node region to an image of a different participant is done in response to detecting that the different participant is the gaze recipient.

21. The method of claim 12, wherein the input is received from a participant's manual selection of an image.

* * * * *